(12) United States Patent  
Yoshihara

(10) Patent No.: US 8,330,914 B2
(45) Date of Patent: Dec. 11, 2012

(54) ANTI-REFLECTION FILM

(75) Inventor: Toshiaki Yoshihara, Tokyo (JP)

(73) Assignee: Toppan Printing Co., Ltd. (JP)

( * ) Notice: Subject to any disclaimer, the term of this patent is extended or adjusted under 35 U.S.C. 154(b) by 395 days.

(21) Appl. No.: 12/648,077

(22) Filed: Dec. 28, 2009

(65) Prior Publication Data

US 2010/0171908 A1   Jul. 8, 2010

(30) Foreign Application Priority Data

Jan. 6, 2009   (JP) ................................ 2009-000654

(51) Int. Cl.
*G02F 1/1335* (2006.01)
(52) U.S. Cl. .......................................... 349/137; 349/96
(58) Field of Classification Search .................. None
See application file for complete search history.

(56) References Cited

U.S. PATENT DOCUMENTS

2008/0095999 A1* 4/2008 Yoshihara et al. ............ 428/220

FOREIGN PATENT DOCUMENTS

| JP | 11-092750 | 4/1999 |
|----|-----------|--------|
| JP | 2004-004149 | 1/2004 |
| JP | 2005-173216 | 6/2005 |
| JP | 2005-199707 | 7/2005 |
| JP | 2005-202389 | 7/2005 |
| JP | 2005-297271 | 10/2005 |
| JP | 2006-016447 | 1/2006 |
| JP | 2006-154758 | 6/2006 |
| JP | 2009151270 A * | 7/2009 |

* cited by examiner

*Primary Examiner* — Thanh-Nhan P Nguyen
(74) *Attorney, Agent, or Firm* — Squire Sanders (US) LLP

(57) ABSTRACT

The present invention provides an anti-reflection film which weakens color in reflection light and prevents an occurrence of color unevenness. The anti-reflection film has a value in the range of 0.5-1.5% as an average luminous reflectance, a value in the range of 0.2-0.9% as a difference between the maximum and the minimum of spectral reflectance in the visible light region, a value in the range of 0.5-3.0% as an absorption loss in average luminous transmittance, a value in the range of 0.5-4.0% as a difference between the maximum and the minimum of absorption losses in light transmittance at all wavelengths within the visible light region, and a magnitude relation of $Q_{450}>Q_{550}>Q_{650}$, where $Q_{450}$, $Q_{550}$ and $Q_{650}$ is an absorption loss in light transmittance of said anti-reflection film at wavelengths of 450 nm, 550 nm 650 nm.

16 Claims, 3 Drawing Sheets

ANTI-REFLECTION FILM

CROSS REFERENCE TO RELATED APPLICATION

This application is based on and claims the benefit of priority from the Japanese Patent Application number 2009-000654, filed on Jan. 6, 2009, the entire contents of which are incorporated herein by reference.

BACKGROUND OF THE INVENTION

1. Field of the Invention

The present invention relates to an anti-reflection film to prevent external light from reflecting on a window or a surface of display devices etc. Specifically, the present invention relates to an anti-reflection film applied on a surface of liquid crystal displays (LCDs) or transmission type LCDs.

2. Description of the Related Art

In general, displays are used under external light whether they are used indoors or outdoors. The external light incident to a display surface is reflected on the surface so that a displayed image is interfered with by the reflected image and the quality of display decreases. Hence, it is necessary to provide a display surface with an anti-reflection function, and further, improvements of the anti-reflection function along with introductions of other extra useful functions are being demanded.

The anti-reflection function is generally obtained by forming an anti-reflection layer of a multilayer repeating high and low refractive index sub-layers made of a transparent material such as metal oxides etc. on a transparent substrate. The anti-reflection layer of such a multilayer can be formed by a dry coating method such as chemical vapor deposition (CVD) and physical vapor deposition (PVD). While having an advantage of being able to precisely control layer thicknesses of the high and low refractive index sub-layers, dry coating methods have a disadvantage of low productivity for mass production due to a deposition process under vacuum. Hence, wet coating methods, in which a coating liquid for forming an anti-reflection layer is used, are attracting attention as a forming method of the anti-reflection layer since they are, in contrast, applicable to a large size production, a continuous production and a low cost production of the anti-reflection layer.

In addition, in the case where the anti-reflection film is formed on a transparent film substrate, a production method in which the anti-reflection layer is formed on a hard coat layer made of a polyfunctional acrylic polymer preliminarily formed on the substrate is generally employed for the purpose of providing hardness to the relatively soft surface. While having a high level of surface hardness, gloss, transparency and abrasion resistance, the hard coat layer also has a strong insulation quality which easily results in charging. Hence, this production method has a problem of collecting dust and the occurrence of errors in a display production caused by charging due to a strong insulation quality In order to provide the anti-reflection film with antistatic properties, a method of introducing a conducting agent and a method of arranging an antistatic layer between the hard coat layer and the anti-reflection layer have been disclosed.
<Patent document 1> JP-A-2005-202389
<Patent document 2> JP-A-2005-199707
<Patent document 3> JP-A-2006-016447
<Patent document 4> JP-A-H11-092750
<Patent document 5> JP-A-2004-004149
<Patent document 6> JP-A-2005-173216
<Patent document 7> JP-A-2005-297271
<Patent document 8> JP-A-2006-154758

In the method of introducing a conducting agent, there are problems of increasing material cost and hardness decrease of the hard coat layer etc. since a tremendous amount of conducting agent is required to obtain sufficient conductivity. Whereas in the method of arranging an antistatic layer, there are problems of color generation and unevenness due to the antistatic layer which is newly arranged between layers and generally has a high refractive index. Especially in the case where the antistatic layer and the anti-reflection (low refractive index) layer are formed by a wet coating method, there is a problem that in-plane thickness unevenness of the antistatic layer and the anti-reflection (low refractive index) layer tends to appear as a color unevenness of the resultant anti-reflection film.

In addition, in an anti-reflection film which has a hard coat layer, an antistatic layer and a low refractive index layer (anti-reflection layer) in the order of this description from the transparent substrate side, a polarizing layer and a second transparent substrate is arranged on the opposite side of a (first) transparent substrate from the side on which the anti-reflection layer is formed so that a polarizing plate which is applicable to a transmission type LCD is obtained. In the case where the polarizing plate employs iodine added elongated polyvinyl alcohol as a polarizing layer, there is a problem when it is applied on a transmission type LCD, that blue light leakage occurs during a black display state.

SUMMARY OF THE INVENTION

The present invention not only provides an antistatic function and anti-reflection function to an anti-reflection film which has a hard coat layer, an antistatic layer and low refractive index layer sequentially on the substrate but also weakens color and unevenness of reflection light. Moreover, in the present invention, the problem whereby blue light leakage occurs during a black display state when the anti-reflection film is applied on a transmission type LCD is solved by selecting transmission light so that a better black display image is obtained.

Therefore, a first aspect of the present invention is an anti-reflection film having a transparent substrate, a hard coat layer, an antistatic layer and a low refractive index layer, wherein the hard coat layer, the antistatic layer and the low refractive index layer are formed in order on the transparent substrate, an average luminous reflectance of the anti-reflection film on the surface of the low refractive index layer is in the range of 0.5-1.5%, a difference between the maximum and the minimum of spectral reflectance of the anti-reflection film on the surface of the low refractive index layer in the wavelength region of 400-700 nm is in the range of 0.2-0.9%, an absorption loss in average luminous transmittance of the anti-reflection film is in the range of 0.5-3.0%, a difference between the maximum of absorption losses in light transmittance at all wavelengths within the visible light region of the anti-reflection film and minimum of absorption losses in light transmittance at all wavelengths within the visible light region of the anti-reflection film is in the range of 0.5-4.0%, and there is a magnitude relation of $Q_{450} > Q_{550} > Q_{650}$, where $Q_{450}$ is an absorption loss in light transmittance of the anti-reflection film at a wavelength of 450 nm, $Q_{550}$ is an absorption loss in light transmittance of the anti-reflection film at a wavelength of 550 nm and $Q_{650}$ is an absorption loss in light transmittance of the anti-reflection film at a wavelength of 650 nm.

In addition, a second aspect of the present invention is the anti-reflection film according to the first aspect of the present invention, wherein a refractive index $n_h$ of the hard coat layer and a refractive index $n_h$ of the transparent substrate satisfies a relation of $0<|n_h-n_b|\leqq 0.05$, a refractive index $n_a$ of the antistatic layer and a refractive index $n_h$ of the hard coat layer satisfies a relation of $0.01\leqq(n_a-n_h)\leqq 0.05$, the optical thickness of the antistatic layer is in the range of 230-270 nm, and the optical thickness of the low refractive index layer is in the range of 115-135 nm.

In addition, a third aspect of the present invention is the anti-reflection film according to any of the first and second aspects of the present invention, wherein a haze of the anti-reflection film is 0.5% or less, and a parallel light transmittance is in the range of 94.0-96.5%.

In addition, a fourth aspect of the present invention is the anti-reflection film according to any of the first to third aspects of the present invention, wherein a surface resistivity of the low refractive index layer of the anti-reflection film is in the range of $1.0\times 10^6$ to $1.0\times 10^{11}\Omega/\square$.

In addition, a fifth aspect of the present invention is the anti-reflection film according to any of the first to fourth aspects of the present invention, wherein a reflection hue in the L*a*b* chromaticity coordinate system satisfies $0.00\leqq a^*\leqq 3.00$ and $-3.00\leqq b^*\leqq 3.00$.

In addition, a sixth aspect of the present invention is the anti-reflection film according to any of the first to fifth aspects of the present invention, wherein zinc oxide series conductive particles are included in the antistatic layer.

In addition, a seventh aspect of the present invention is a polarizing plate including the anti-reflection film according to any of the first to six aspects of the present invention, a polarizing layer and a second transparent substrate, wherein the polarizing layer and the second transparent substrate are arranged in order on an opposite surface of the anti-reflection film from a side on which the low refractive index layer is formed.

In addition, an eighth aspect of the present invention is an LCD including the polarizing plate according to the seventh aspect of the present invention, a liquid crystal cell, a second polarizing plate and a backlight unit in the order of this description.

By adopting the configurations described above, it is possible not only to provide an antistatic function and anti-reflection function but also weaken color and unevenness of reflection light. Moreover, in the present invention, the problem whereby blue light leakage occurs during a black display state when an anti-reflection film is applied on a transmission type LCD is solved by selecting transmission light so that a better black display image is obtained. In addition, it is possible to obtain an anti-reflection film which has excellent contrast in a light place and excellent contrast in a dark place.

DESCRIPTION OF REFERENCE NUMERALS AND SIGNS

Figure 1:
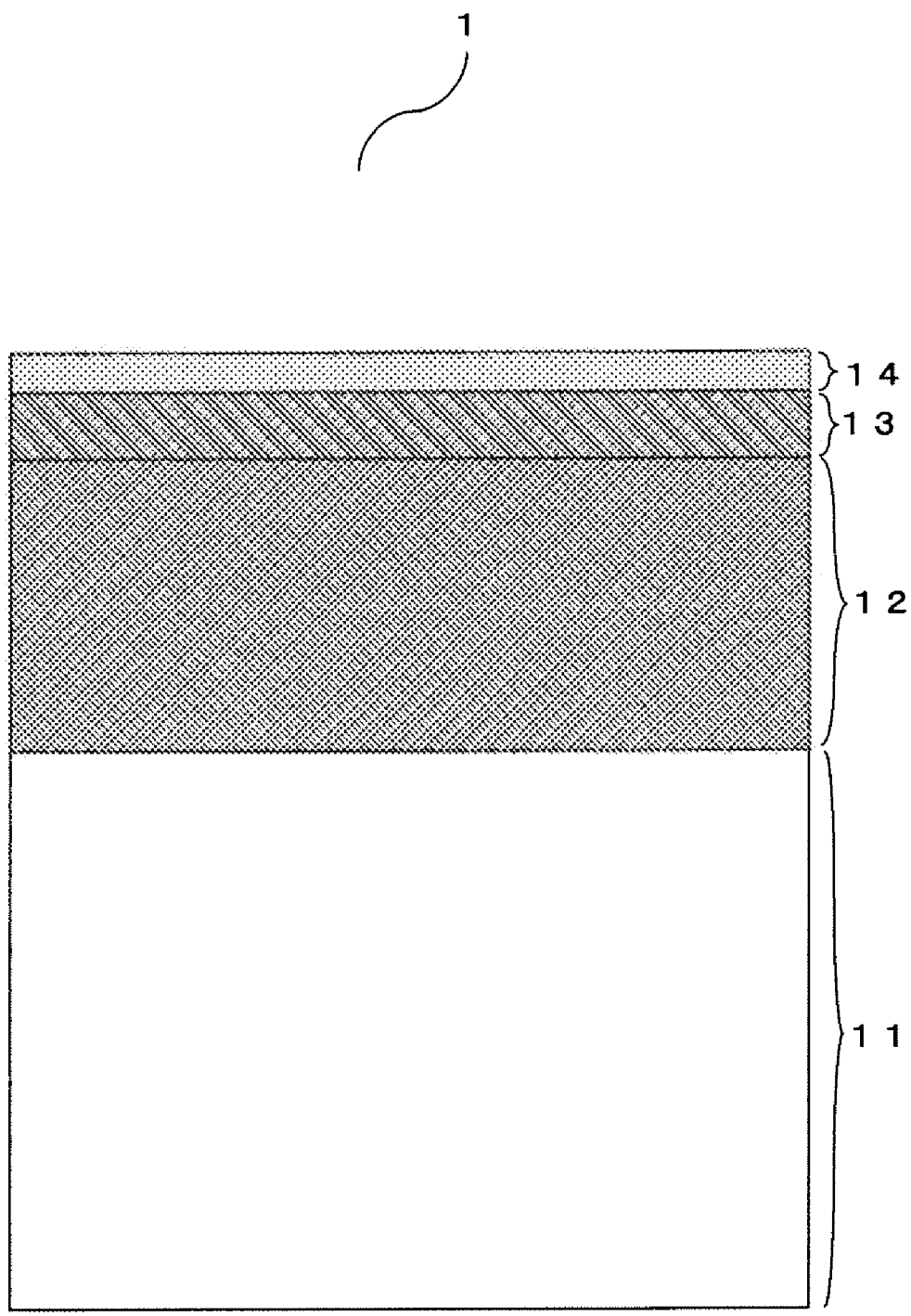
FIG. 1 is a cross section exemplary diagram of an anti-reflection film of the present invention.

1: Anti-reflection film
11: First transparent substrate
12: Hard coat layer
13: Antistatic layer
14: Low refractive index layer
2: Polarizing plate
22: Second transparent substrate
23: Polarizing layer
3: Liquid crystal cell
4: Second polarizing plate
41: Third transparent substrate
42: Fourth transparent substrate
43: Second polarizing layer
5: Backlight unit

DETAILED DESCRIPTION OF THE INVENTION

An anti-reflection film of the present invention is described below.

FIG. 1 illustrates a cross section exemplary diagram of an anti-reflection film of the present invention. The anti-reflection film 1 of the present invention in FIG. 1 includes a hard coat layer 12, an antistatic layer 13, and a low refractive index layer 14 in order on the first transparent substrate 11.

An anti-reflection function is provided by an optical interference between a low refractive index layer 14 and an antistatic layer 13 in the anti-reflection film of the present invention. The antistatic layer 13 acts as a high refractive index layer A coating liquid containing a conductive material is used in forming the antistatic layer 13 of the present invention. The antistatic layer 13 of the present invention is formed by coating a coating liquid for forming an antistatic layer on the hard coat layer by a wet coating. Similarly, a coating liquid containing a low refractive index material is used in forming the antistatic layer 13 of the present invention, which is formed by coating a coating liquid for forming a low refractive index layer on the antistatic layer by a wet coating.

It is a feature of the anti-reflection film of the present invention that <a>: the average luminous reflectance of the anti-reflection film on the low refractive index layer side is in the range of 0.5-1.5%, <b>: the difference between the maximum and the minimum of the spectral reflectance of the anti-reflection film on the low refractive index layer side at wavelengths in the 400-700 nm range is in the range of 0.2-0.9%, <c>: the absorption loss in average luminous transmittance of the anti-reflection film is in the range of 0.5-3.0%, <d>: a difference between the maximum absorption loss in light transmittance of the anti-reflection film at a wavelength in the visible light region and the minimum absorption loss in light transmittance of the anti-reflection film at a wavelength in the visible light region is in the range of 0.5-4.0%, and <e>: there is a magnitude relation of $Q_{450}>Q_{550}>Q_{650}$ where $Q_{450}$ is an absorption loss in light transmittance of the anti-reflection film at a wavelength of 450 nm, $Q_{550}$ is an absorption loss in light transmittance of the anti-reflection film at a wavelength of 550 nm, and $Q_{650}$ is an absorption loss in light transmittance of the anti-reflection film at a wavelength of 650 nm. The anti-reflection film of the present invention satisfies all factors <a> to <e> so as to obtain excellent anti-reflection properties, reduce color generation in reflection light, prevent color unevenness on the anti-reflection film, and further, solve the problem that the display image becomes blue during the black display state by selecting transmission light and make it possible to display a more desirable black.

It is a feature of the anti-reflection film of the present invention that <a>: the average luminous reflectance of the anti-reflection film on the low refractive index layer side is in the range of 0.5-1.5%, <b>: the difference between the maximum and the minimum of the spectral reflectance of the anti-reflection film on the low refractive index layer side at wavelengths in the 400-700 nm range is in the range of 0.2-0.9%.

A reflectance spectrum curve of the anti-reflection film of the present invention is measured in such a way that after the transparent substrate film surface on which a hard coat layer, an antistatic layer and a low refractive index layer are not arranged is coated with a matte-black paint, the curve is measured by a spectrophotometer. The reflectance spectrum curve of the anti-reflection film of the present invention is measured by using C light as a light source and adjusting an incident angle and an output angle of the light source and a detector respectively to a 5 degree direction from the vertical direction of the anti-reflection film surface. The average luminous reflectance is a light reflectance corrected with relative luminosities at various wavelengths of the visible light and averaged. At this time, the photopic relative luminous efficiency function is used for the relative luminosities.

It is a feature of the anti-reflection film of the present invention that <a>: the average luminous reflectance of the anti-reflection film on the low refractive index layer side is in the range of 0.5-1.5%. In the case where the average luminous reflectance exceeds 1.5%, it is impossible to manufacture an anti-reflection film with a sufficient anti-reflection function. Whereas, in the case where the average luminous reflectance is less than 0.5%, it becomes difficult to satisfy the condition that <b>: the difference between the maximum and the minimum of the spectral reflectance of the anti-reflection film on the low refractive index layer side at wavelengths in the 400-700 nm range is in the range of 0.2-0.9%.

In addition, it is another feature of the anti-reflection film of the present invention that <b>: the difference (A−B) between the maximum value (A) and the minimum value (B) of the spectral reflectance of the anti-reflection film on the low refractive index layer side at wavelengths in the 400-700 nm range is in the range of 0.2-0.9%. The spectral reflectance curve in the wavelength range of 400-700 nm of the present invention takes a local minimum value, which is a boundary of a moderately downward-sloping reflectance curve with increasing wavelength and a moderately upward-sloping reflectance curve with increasing wavelength.

It is possible to make the spectral reflectance curve of the anti-reflection film of the present invention in the wavelength range of 400-700 nm an extremely gentle curve with moderate changes by satisfying the conditions <a> and <b>. It becomes possible to make the anti-reflection film not only having an almost colorless reflection hue but also free from color unevenness by making the spectral reflectance curve a gentle U shaped curve with extremely moderate changes.

In the case where the antistatic layer and the low refractive index layer are formed by a wet coating method, it is possible to dramatically reduce manufacturing cost relative to the case where the antistatic layer and the low refractive index layer is formed by a dry coating method, which requires vacuum equipment. It is possible to provide an anti-reflection film at a low cost if an antistatic layer and a low refractive index layer are formed by a wet coating method.

In the case where the antistatic layer and the low refractive index layer are formed by a wet coating method, however, the resultant antistatic layer and the low refractive index layer tend to have more in-plane thickness variation than in the case where the layers are formed by a dry coating method such as a vapor deposition method and a sputtering method etc. In-plane thickness variation of the antistatic layer and the low refractive index layer are observed as in-plane color unevenness since the anti-reflection function of the anti-reflection film is generated by optical interference of the antistatic layer and the low refractive index layer.

In the present invention, it is possible to reduce color unevenness caused by in-plane thickness variation of the antistatic layer and the anti-reflection layer by making the spectral reflectance curve of the anti-reflection film an extremely gentle curve. In other words, it is possible to manufacture an anti-reflection film in which color unevenness is hardly observed even if the antistatic layer and the anti-reflection layer have in-plane thickness unevenness due to a wet coating method by such a way. In the case where there is an immoderate change in spectral reflectance curve, the anti-reflection film tends to change color by thickness variation of the antistatic layer and the low refractive index layer, which tends to be observed as color unevenness.

In the case where the difference (A−B) between the maximum value (A) and the minimum value (B) of the spectral reflectance of the anti-reflection film on the low refractive index layer side at wavelengths in the 400-700 nm range is more than 0.9%, the spectral reflectance curve involves an immoderate change accordingly. As a result, not only reflection hue expands but also color unevenness caused by thickness variation of the antistatic layer and the anti-reflection layer is observed.

The smaller the difference (A−B) between the maximum value (A) and the minimum value (B) of the spectral reflectance of the anti-reflection film on the low refractive index layer side at wavelengths in the 400-700 nm range is, the better. It is, however, difficult to make an anti-reflection film in which the difference (A−B) between the maximum value (A) and the minimum value (B) of the spectral reflectance is smaller than 0.5% by means of optical interference of the two layers (a low refractive index layer and an antistatic layer).

It is possible to make the spectral reflectance curve a gentle curve with moderate changes in the wavelength range of 400-700 nm in the present invention by satisfying factors <a>: the average luminous reflectance of the anti-reflection film on the low refractive index layer side is in the range of 0.5-1.5%, and <b>: the difference between the maximum value and the minimum value of the spectral reflectance of the anti-reflection film on the low refractive index layer side at wavelengths in the 400-700 nm range is equal to or less than 0.9%.

In the present invention, it is possible to make an anti-reflection film having not only an almost colorless reflection hue but also no color unevenness since the spectral reflectance curve at a wavelength around 550 nm, which corresponds to a high relative luminosity region, is almost plane. It is necessary that the spectral reflectance curve at a wavelength around 550 nm, which corresponds to a high relative luminosity region, is as plane as possible to make an anti-reflection film having a colorless reflection hue and no color unevenness.

In addition, it is possible to make changes in spectral reflectance in a short wavelength region of around 400-450 nm where the spectral reflectance curve slopes downward as the wavelength increases and in a long wavelength region of around 600-700 nm where the spectral reflectance curve slopes upward as the wavelength increases in the anti-reflection film of the present invention. As a result, it is possible to manufacture an anti-reflection film of which the reflection hue is not only almost colorless but also free from bluish unevenness.

The lower the luminous reflectance of the anti-reflection film is, the higher the anti-reflection performance of the anti-reflection film becomes. It is, however, difficult to weaken or dilute color of the reflected light as well as prevent a generation of color unevenness when a high level of anti-reflection performance is desired. In such a situation, the inventor has succeeded in weakening or diluting color of the reflected light as well as preventing a generation of color unevenness by making the average luminous reflectance of the anti-reflection film in the range of 0.5-1.5% and making the difference between the maximum and the minimum spectral reflectances of the anti-reflection film at wavelengths in the 400-700 nm range within the range of 0.2-0.9%. In other words, the inventor has succeeded in obtaining an anti-reflection film of which the color of the reflected light is weakened or diluted and of which the color unevenness caused by thickness variation of the low refractive index layer and the antistatic layer formed by wet coating is hardly observed, by means of making the spectral reflectance curve of the anti-reflection film on the low refractive index layer's side in the wavelength range of 400-700 nm a gentle U shaped curve with moderate changes.

In addition, it is a feature of the anti-reflection film of the present invention that <c>: the absorption loss in average luminous transmittance of the anti-reflection film is in the range of 0.5-3.0%, <d>: a difference between the maximum absorption loss in light transmittance of the anti-reflection film at a wavelength in the visible light region and the minimum absorption loss in light transmittance of the anti-reflection film at a wavelength in the visible light region is in the range of 0.5-4.0%, and <e>: there is a magnitude relation of $Q_{450} > Q_{550} > Q_{650}$ where $Q_{450}$ is an absorption loss in light transmittance of the anti-reflection film at a wavelength of 450 nm, $Q_{550}$ is an absorption loss in light transmittance of the anti-reflection film at a wavelength of 550 nm, and $Q_{650}$ is an absorption loss in light transmittance of the anti-reflection film at a wavelength of 650 nm. The anti-reflection film of the present invention satisfies the factors <c> to <e> so that an LCD which has this anti-reflection film on the surface can overcome the problem that the display image becomes somewhat blue during a black display state by selecting a transmission light and displays a more appropriate black.

It is a feature of the anti-reflection film of the present invention that <c>: the absorption loss in light transmittance of the anti-reflection film is in the range of 0.5-3.0%

The absorption loss in light transmittance $Q_\lambda$ is obtained from the following equation.

$$Q_\lambda = 100 - H - T - R \qquad \text{<formula 1>}$$

where
$Q_\lambda$: absorption loss in light transmittance [%]
H: haze [%]
T: spectral transmittance [%]
R: reflectance of both surfaces [%]

The reflectance of both surfaces refers to a sum of both reflectances of front surface reflectance Rs and back surface reflectance Rb. Reflectance measurement of the anti-reflection film can be performed after the back surface is made rough with sandpaper etc. and coated with black paint to prevent back reflection so that only front surface reflectance Rs is measured. Whereas reflectance measurement of the anti-reflection film can also be performed without making the back surface rough and coating black paint so that reflectance of both surfaces R=(Rs+Rb) at various wavelength is measured. As is apparent from <formula 1>, $Q_\lambda$ (absorption loss in light transmittance) of the present invention is a loss caused not by scattering but by optical absorption.

The haze of the anti-reflection film can be obtained by JIS (Japanese Industrial Standard) K 7105 (1981). In measuring spectral transmittance T and reflectance of both surfaces R=(Rs+Rb) at various wavelengths of the anti-reflection film, using light source C as the light source and adjusting incidence angle and output angle in terms of the light source and detector to 5° from the perpendicular direction of the anti-reflection film surface, spectral reflectance in a specular reflection direction and rectilinear transmission direction is measured under a condition of 2° of field of view. Absorption loss in average luminous transmittance Q is a value obtained by correcting $Q_\lambda$s (absorption losses in light transmittances at wavelengths in the visible light region) by relative luminosity and averaging them. At this time, the photopic relative luminous efficiency function is used for the relative luminosities.

In the present invention, it is possible to provide an anti-reflection film which serves to manufacture a display device having an excellent contrast in a bright place and an excellent contrast in a dark place by making the absorption loss in average luminous transmittance in the range of 0.5-3.0%. In the case where the absorption loss in transmittance is less than 0.5%, the contrast in a dark place falls since a certain degree of light filters out from the film during a black display state resulting in a slight increase in luminance of the display when a black image is displayed (an increase of black luminance). On the other hand, if the absorption loss in transmittance of the anti-reflection film exceeds 3.0%, although it is possible to reduce the black luminance, luminance of the display when a white image is displayed (a white luminance) may also decrease resulting in a decrease in contrast.

It is a feature of the anti-reflection film of the present invention that <d>: a difference between the maximum absorption loss in light transmittance of the anti-reflection film at a wavelength in the visible light region and the minimum absorption loss in light transmittance of the anti-reflection film at a wavelength in the visible light region is in the range of 0.5-4.0%. By making the difference between the maximum and the minimum absorption losses in light transmittance at a wavelength in the visible light region a value within the range of 0.5-4.0%, it is possible to provide an anti-reflection film which dose not harm color reproducibility if applied on a display device because in such a case the absorption loss in light transmittance of the anti-reflection film has only a moderate dependence on wavelength in the visible light region. In the case where the difference between the maximum and the minimum absorption losses in light transmittance at a wavelength in the visible light region exceeds 4%, the anti-reflection film is supposed to have a large optical absorption at a certain wavelength so that a display device applying the film shows a colored image when a white image should be shown. On the other hand, in the case where the difference between the maximum and the minimum absorption losses in light transmittance at a wavelength in the visible light region is less than 0.5%, there is a problem that a transmission type LCD applying the anti-reflection film shows a bluish image during a black display state. The intended visible light region in terms of the maximum and the minimum absorption losses in light transmittance is a wavelength region ranging from 400 nm to 700 nm in the present invention.

It is a feature of the anti-reflection film of the present invention that <e>: there is a magnitude relation of $Q_{450} > Q_{550} > Q_{650}$ where $Q_{450}$ is an absorption loss in light transmittance of the anti-reflection film at a wavelength of 450 nm, $Q_{550}$ is an absorption loss in light transmittance of the anti-reflection film at a wavelength of 550 nm, and $Q_{650}$ is an absorption loss in light transmittance of the anti-reflection film at a wavelength of 650 nm. It is possible to make the anti-reflection film of the present invention have a moderate optical absorption in a short wavelength region by satisfying <d>: a difference between the maximum absorption loss in light transmittance of the anti-reflection film at a wavelength in the visible light region and the minimum absorption loss in light transmittance of the anti-reflection film at a wavelength in the visible light region is in the range of 0.5-4.0% and <e>: there is a magnitude relation of $Q_{450}>Q_{550}>Q_{650}$ where $Q_{450}$ is an absorption loss in light transmittance of the anti-reflection film at a wavelength of 450 nm, $Q_{550}$ is an absorption loss in light transmittance of the anti-reflection film at a wavelength of 550 nm, and $Q_{650}$ is an absorption loss in light transmittance of the anti-reflection film at a wavelength of 650 nm.

It is possible to selectively solve a problem that a transmission type LCD having a polarizing plate of iodine-added elongated polyvinyl alcohol as a polarizing layer shows a bluish image during a black display state by making the anti-reflection film of the present invention have a moderate optical absorption in a short wavelength region and arranging this film on the observer's side surface of the LCD to obtain a more appropriate black display. In other words, it is possible to selectively solve a problem that a transmission type LCD shows a bluish image when a black image should be displayed by an application of the anti-reflection film of the present invention because the bluish light which leaks when a pair of the polarizing plates (made of iodine-added elongated polyvinyl alcohol) are arranged in such a way that their polarizing directions are orthogonally oriented is selectively absorbed.

In addition, it is preferable in the anti-reflection film of the present invention that an absolute value of a difference in refractive index between the hard coat layer and the transparent substrate is less than (or equal to) 0.05, a difference in refractive index between the antistatic layer and the hard coat layer is in the range of 0.01-0.05, an optical thickness of the antistatic layer is in the range of 230-270 nm, and an optical thickness of the low refractive index layer is in the range of 115-135 nm.

An absolute value of a difference in refractive index between the hard coat layer and the transparent substrate is less than (or equal to) 0.05 herein means a relation of $0<|n_h-n_b|\leq 0.05$, where $n_h$ is the refractive index of the hard coat layer and $n_b$ is the refractive index of the transparent substrate. A difference in refractive index between the antistatic layer and the hard coat layer is in the range of 0.01-0.05 herein means a relation of $0<(n_a-n_h)\leq 0.05$, where $n_a$ is the refractive index of the antistatic layer and $n_h$ is the refractive index of the hard coat layer.

It is easily possible to provide an anti-reflection film satisfying <a>: the average luminous reflectance of the anti-reflection film on the low refractive index layer side is in the range of 0.5-1.5%, and <b>: the difference between the maximum value and the minimum value of the spectral reflectance of the anti-reflection film on the low refractive index layer side at wavelengths in the 400-700 nm range is in the range of 0.2-0.9%, so that the spectral reflectance curve becomes a gentle U shaped curve, the anti-reflection film has an almost colorless reflection hue and no color unevenness by making the differences in refractive index between the transparent substrate and the hard coat layer and between the hard coat layer and the antistatic layer in the above described ranges and optical thicknesses of the antistatic layer and low refractive index layer in the above described ranges in the present invention.

It is possible to obtain refractive indexes of the hard coat layer and the antistatic layer in the present invention by a direst measurement method such as Becke line method etc. or by an optical thin film simulation method using a spectrophotometer or a spectral ellipsometer.

It is preferable that the difference in refractive index between the transparent substrate and the hard coat layer is within 0.05 in the present invention. In the case where the difference exceeds 0.05, an interference fringe caused by optical interference between different layers occurs.

In addition, it is preferable that the difference in refractive index between the hard coat layer and the antistatic layer is in the range of 0.01-0.05 in the present invention. Due to the fact that the refractive index of the hard coat layer is lower than that of the antistatic layer and the difference is in the range of 0.01-0.05, the antistatic layer performs as a high refractive index layer which serves to prevent a colored reflection and color unevenness on the anti-reflection film. In the case where the difference in refractive index between the hard coat layer and the antistatic layer exceeds 0.05, it becomes difficult to make the difference between the maximum and the minimum of the spectral reflectance in the range of 0.2-0.9% because of an interlayer optical interference. On the other hand, in the case where the difference is less than 0.01, it is difficult to make an optical reflectance curve a gentle U shaped curve because the refractive indexes of the hard coat layer and the antistatic layer are almost the same and the antistatic layer does not perform as a high refractive index layer.

In addition, it is preferable that the optical thickness of the antistatic layer is in the range of 230-270 nm and the optical thickness of the low refractive index layer is in the range of 115-135 nm in the anti-reflection film of the present invention.

The antistatic layer is designed to have an optical thickness of around $\lambda/2$ and the low refractive index layer is designed to have an optical thickness of around $\lambda/4$ in the anti-reflection film of the present invention, wherein $\lambda=500$ nm. Then, it is possible to make the spectral reflectance curve of the anti-reflection a gentle curve which moderately decreases with increasing wavelength and beyond local minimum value turns to a moderate increase.

Figure 2:
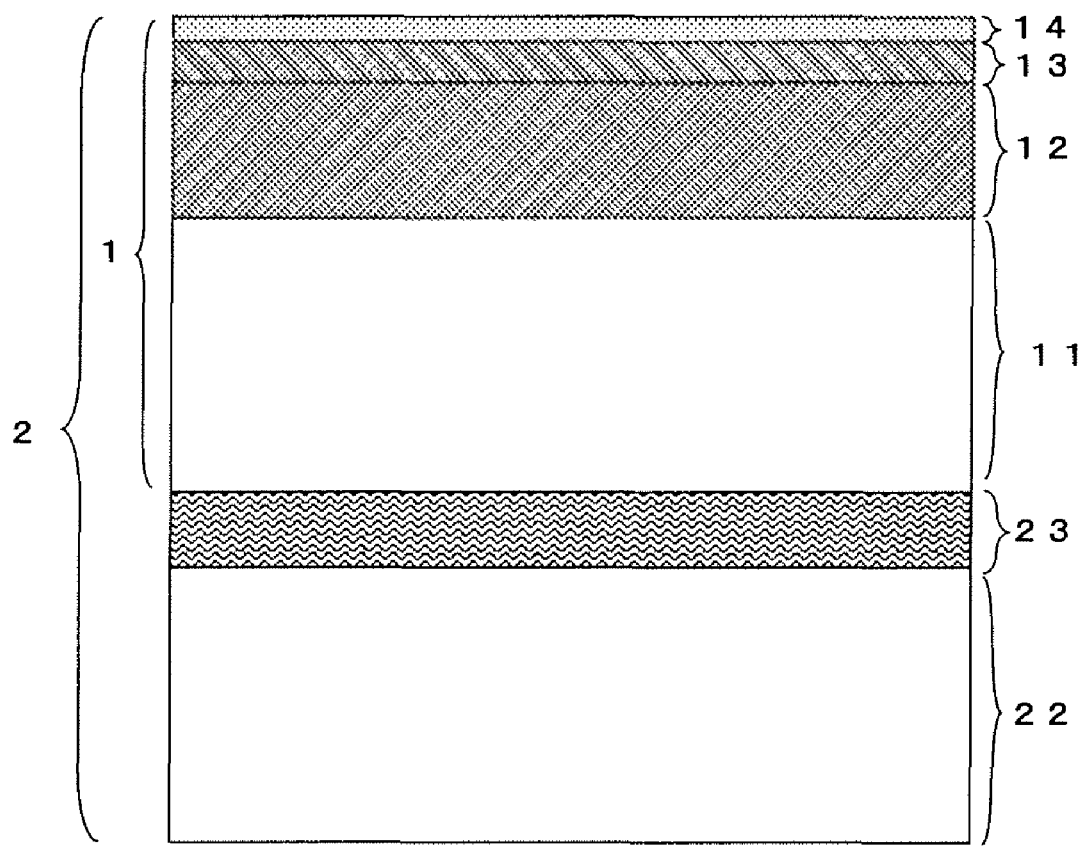
FIG. 2 is a cross section exemplary diagram of a polarizing plate of the present invention using an anti-reflection film of the present invention.

As is shown in FIG. 2, the spectral reflectance curve of the anti-reflection film of the present invention tends to have a steeper increasing slope (curve) in a short wavelength direction than in a long wavelength direction from the local minimum point. At this time, the steeper increasing curve in the short wavelength direction can cause a color unevenness of the anti-reflection film when thickness unevenness of the antistatic layer or the anti-reflection layer occurs. It is possible to make the reflection hue small and to make the difference (A–B) between the maximum (A) and the minimum (B) within 0.9% so that generation of the color unevenness caused by the steeply increasing curve in the short wavelength direction is prevented by adjusting the wavelength at the local minimum of the spectral reflectance curve to about 500 nm in the present invention.

For example, in the case where $\lambda$ is a high relative luminosity wavelength of 550 nm, when the thickness of the low refractive index layer is $\lambda/4$ and the thickness of the anti-reflection layer is $\lambda/2$, the increasing curve in the short wavelength direction becomes steep and the reflectance at a wavelength 400 nm becomes high. Then, it is difficult to make the difference of the maximum and the minimum of the spectral reflectance less than (or equal to) 0.9%. In addition, bluish color unevenness is likely to occur due to a small thickness variation of the low refractive index layer and the antistatic layer.

In addition, it is preferable that the haze of the anti-reflection film of the present invention is less than (or equal to) 0.5%, and a parallel light transmittance is in the range of 94.5-96.5% in the present invention.

It is possible to manufacture an anti-reflection film having a high level of contrast in the bright place by making the haze of the anti-reflection film within 0.5% in the present invention. In the case where the haze exceeds 0.5%, it appears that light leakage of an LCD in the dark place does not occur due to a scattering loss in light transmission. This scattering, however, causes a white blur in a black display state in the bright place resulting in a decrease in contrast. The haze of the anti-reflection film is obtained by JIS K7105 (1981).

It is possible to improve contrast of an LCD using this anti-reflection film to a satisfactory level by making parallel light transmittance of the anti-reflection film in the range of 94.0-96.5%. If the parallel light transmittance of the anti-reflection film is lower than 94.0%, white luminance in a white display state decreases resulting in a fall in contrast. This decrease in white luminance also cancels out an effect of the improvement of parallel light transmission by an arrangement of the low refractive index layer. On the other hand, an anti-reflection film with parallel light transmission higher than 96.5% is hard to produce in practice considering rear surface reflection. Thus, it is a feature of the anti-reflection in the present invention that its parallel light transmittance is in the range of 94.0-96.5%. The parallel light transmittance of the anti-reflection film is obtained by JIS K7105 (1981).

In addition, it is preferable in the present invention that a surface resistivity of the low refractive index layer is in the range of $1.0 \times 10^6 - 1.0 \times 10^{11} \Omega/\square$. By adjusting the surface resistivity of the low refractive index layer of the anti-reflection film of the present invention in the above described range, it is possible to provide the anti-reflection film with an antistatic function so as to make a display device on which the anti-reflection film is applied free from dust. It is also possible to prevent static charges influencing the internal operation of the display device. If the surface resistivity of the low refractive index layer is higher than $1.0 \times 10^{11} \Omega/\square$, it is impossible to provide the anti-reflection film with sufficient antistatic functionality. On the other hand, if the surface resistivity of the low refractive index layer is lower than $1.0 \times 10^6 \Omega/\square$, an amount of conductive particles which have to be contained in the binder matrix in the antistatic layer is too large to economically produce the anti-reflection film. In addition, it may also be impossible to adjust optical properties of the anti-reflection film so as to meet a display application. It is possible to provide the anti-reflection film with an antistatic function and make the surface resistivity within the above described range by adding conductive materials to the hard coat layer.

In addition, it is preferable in the anti-reflection film of the present invention that the reflection hue of the anti-reflection film's surface on which the low refractive index layer is formed, namely, the reflection hue of the low refractive index layer's surface is in the range of $0.00 \leq a^* \leq 3.00$ and $-3.00 \leq b^* \leq 3.00$ in the L*a*b* chromaticity coordinate system. It is possible to make the anti-reflection film colorless so as to be more suitable for use on a display device by making the reflection hue of the low refractive index layer's surface within the above described range.

The closer to 0 the a* and b* are, the more colorless the reflection hue is. The region of $-3.00 \leq a^* \, 0.00$, however, is a green region, in which the relative luminous efficiency is high so that a reflection color is easily observed by human vision. Thus, the anti-reflection film of the present invention preferred to have a reflection hue of $0.00 \leq a^* \leq 3.00$ and $-3.00 \leq b^* \leq 3.00$ in chromaticity.

The reflection hue of the anti-reflection film of the present invention is measured by a spectrophotometer after matte black paint is coated on the opposite surface of the transparent substrate from the side on which the hard coat layer and the low refractive index layer are formed. Using C light source as a light source and adjusting an incident angle and an output angle of the light source and a detector to 5 degrees from the vertical direction of the anti-reflection film surface, a spectral reflectance in a specular direction is measured with 2 degrees of field of view.

In addition, it is preferable in the anti-reflection film of the present invention that the conductive material contained in the antistatic layer includes zinc oxide series particles. In zinc oxide series particles such as particles of zinc oxide, aluminum doped zinc oxide (AZO) and gallium doped zinc oxide (GZO) etc., there is a tendency that an absorption loss in transmittance at a wavelength in the visible light region decreases as the wavelength increases. Thus, if conductive particles of zinc oxide series are used, it becomes easily possible to make an anti-reflection film satisfying $Q_{450} > Q_{550} > Q_{650}$, a relation of absorption losses in transmittance at wavelengths 450 nm, 550 nm and 650 nm. In addition, conductive particles of zinc oxide series particles such as zinc oxide, aluminum doped zinc oxide (AZO) and gallium doped zinc oxide (GZO) etc. provide an antistatic function to an anti-reflection film.

Next, a polarizing plate using the anti-reflection film of the present invention is described. FIG. 2 illustrates a cross sectional exemplary diagram of the polarizing plate using the anti-reflection film of the present invention. The polarizing plate 2 of the present invention has such a structure that a polarizing layer is interposed between a pair of transparent substrates. The anti-reflection film of the present invention has a hard coat layer, an antistatic layer and a low refractive index layer on one surface of the transparent substrate. The polarizing plate 2 of the present invention has a polarizing layer 23 and the second transparent in order on the other surface of the transparent substrate which is incorporated in the anti-reflection film 1. In other words, the first transparent substrate 1 which is incorporated in the anti-reflection film 1 is also used as a substrate for interposing the polarizing layer 23.

Figure 3:
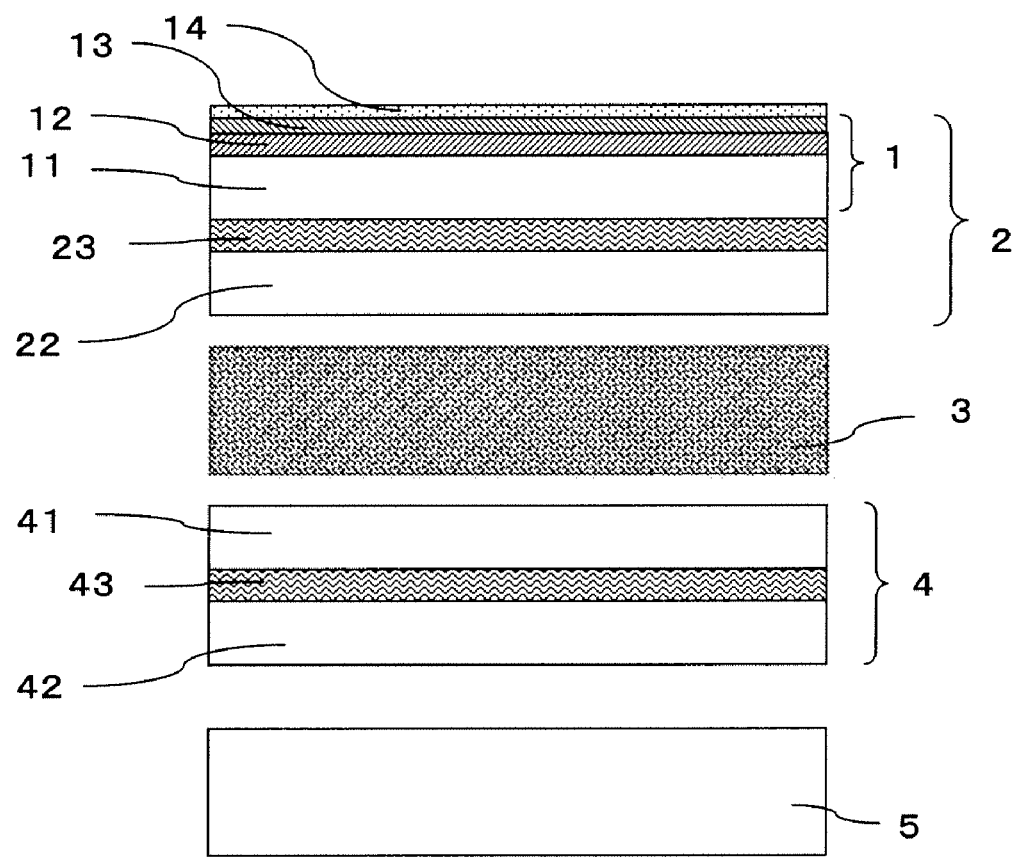
FIG. 3 is a cross section exemplary diagram of a transmission type LCD of the present invention including an anti-reflection film of the present invention.

Next, a transmission type LCD using the anti-reflection film of the present invention is described. FIG. 3 illustrates a cross sectional exemplary diagram of a transmission type LCD having the anti-reflection film of the present invention. The transmission type LCD of the present invention shown in FIG. 3 has a backlight unit 5, a second polarizing plate 4, a liquid crystal cell 3, and a first polarizing plate 2 which includes the anti-reflection film 1 of the present invention in the order of this description. At this time, the side of the anti-reflection film is the observer's side, namely, the frontal surface of the display device.

The backlight unit has a light source and a light diffusion plate (which are not shown in FIGS). The liquid crystal cell has a pair of transparent substrates and liquid crystal which are interposed therebetween. Electrodes and color filters are arranged on one of the pair of transparent substrates whereas only electrodes are arranged on the other of the pair of transparent substrates. The second polarizing plate 4 has a second polarizing layer 43 between a third transparent substrate 41 and fourth transparent substrate 42. The liquid crystal cell 3 is interposed between the first polarizing plate 2 and the second polarizing plate 4.

In addition, the transmission type LCD of the present invention may also include other functional parts. Although a prism sheet, a luminance improvement film and a diffusion film, which serve to efficiently utilize light from the backlight unit, and a retardation film, which is used for compensating phase difference of the liquid crystal cell and the polarizing plate, are examples of the functional parts, the transmission type LCD of the present invention is not limited to these examples.

A manufacturing method of the anti-reflection film of the present invention is described below.

Films or sheets made of various organic polymers can be used as the transparent substrate of the anti-reflection film in the present invention. For example, substrates which are ordinarily used for an optical component of a display device, specifically, an organic polymer of polyolefin such as polyethylene and polypropylene etc., polyester such as polyethylene terephthalate and polyethylene naphthalate etc., cellulose such as triacetyl cellulose, diacetyl cellulose and cellophane etc., a polyamide such as 6-nylon and 6,6-nylon etc., acrylate such as polymethyl methacrylate etc., polystyrene, polyvinyl chloride, polyimide, polyvinyl alcohol, polycarbonate, and/or ethylene vinyl alcohol etc. can be used considering their optical properties such as transparency and refractive index etc. along with other characteristics such as impact resistivity, heat resistance and endurance etc. In particular, polyethylene terephthalate, triacetyl cellulose, polycarbonate and polymethyl methacrylate are desirable. Among them, a triacetyl cellulose film is preferred to be used when the anti-reflection film of the present invention is applied on an LCD because triacetyl cellulose has significantly small birefringence and good transparency.

It is preferable that the thickness of the transparent substrate is in the range of 25-200 μm, and in particular 40-80 μm is more preferable.

Moreover, functional materials obtained from these organic polymers by adding a known additive such as, for example, antistatic agent, ultraviolet absorber, infrared absorber, plasticising agent, lubricant, colorant, antioxidant and flame retardant etc. can also be used. In addition, the transparent substrate is not necessarily made from only one of the organic polymers but also a mixture or a copolymer of two or more of these. The transparent substrate may have a stacked structure of a plurality of sub-layers.

Next, a forming method of the hard coat layer on the transparent substrate is described.

The hard coat layer can be formed by coating a coating liquid for forming a hard coat layer, which contains an ionizing radiation curable material, on the transparent substrate to make a coated layer, drying the coated layer if necessary, and then irradiating ionizing radiation such as ultraviolet light or an electron beam to perform a hardening reaction of the ionizing radiation curable material. A coating method in which a roll coater, a reverse roll coater, a gravure coater, a micro gravure coater, a knife coater, a bar coater, a wire bar coater, a die coater or a dip coater is used can be employed as a coating method of the coating liquid for forming a hard coat layer.

Acrylic materials can be used as the ionizing radiation curable material for forming the hard coat layer. A monofunctional or polyfunctional acrylate (or methacrylate) such as acrylic (or methacrylic) ester of polyol, or polyfunctional urethane acrylate (or methacrylate) synthesized from diisocyanate, polyol and hydroxy ester of acrylic (or methacrylic) acid etc. can be used as the acrylic materials. Besides these, a polyether resin, a polyester resin, an epoxy resin, an alkyd resin, a spiroacetal resin, polybutadiene resin and polythiolpolyen resin, etc. can be used as the ionizing radiation curable material.

Acrylate (or methacrylate) in the present invention indicates both acrylate and methacrylate. For example, acrylic (or methacrylic) ester of polyol means both acrylic ester of polyol or methacrylic ester of polyol.

The following materials are examples of monofunctional acrylate (or methacrylate): 2-hydroxyethyl acrylate (or methacrylate), 2-hydroxypropyl acrylate (or methacrylate), 2-hydroxybutyl acrylate (or methacrylate), n-butyl acrylate (or methacrylate), isobutyl acrylate (or methacrylate), t-butyl acrylate (or methacrylate), glycidyl acrylate (or methacrylate), acryloylmorpholine, N-vinylpyrrolidone, tetrahydrofurfuryl acrylate, cyclohexyl acrylate (or methacrylate), 2-ethylhexyl acrylate (or methacrylate), isobornyl acrylate (or methacrylate), isodecyl acrylate (or methacrylate), lauryl acrylate (or methacrylate), tridecyl acrylate (or methacrylate), cetyl acrylate (or methacrylate), stearyl acrylate (or methacrylate), benzyl acrylate (or methacrylate), 2-ethoxyethyl acrylate (or methacrylate), 3-methoxybutyl acrylate (or methacrylate), ethyl carbitol acrylate (or methacrylate), phosphoric acrylate (or methacrylate), (ethylene oxide)-modified phosphoric acrylate (or methacrylate), phenoxy acrylate (or methacrylate), (ethylene oxide)-modified phenoxy acrylate (or methacrylate), (propylene oxide)-modified phenoxy acrylate (or methacrylate), nonylphenol acrylate (or methacrylate), (ethylene oxide)-modified nonylphenol acrylate (or methacrylate), (propylene oxide)-modified nonylphenol acrylate (or methacrylate), methoxydiethylene glycol acrylate (or methacrylate), methoxypolyethylene glycol acrylate (or methacrylate), methoxypropylene glycol acrylate (or methacrylate), 2-acryloyl (or methacryloyl) oxyethyl-2-hydroxypropyl phthalate, 2-hydroxyl-3-phenoxy propyl acrylate (or methacrylate), 2-acryloyl (or methacryloyl) oxyethyl hydrogen phthalate, 2-acryloyl (or methacryloyl) oxypropyl hydrogen phthalate, 2-acryloyl (or methacryloyl) oxypropyl hexahydrohydrogen phthalate, 2-acryloyl (or methacryloyl) oxypropyl tetrahydrohydrogen phthalate, dimethylaminoethyl acrylate (or methacrylate), trifluoroethyl acrylate (or methacrylate), tetrafluoropropyl acrylate (or methacrylate), hexafluoropropyl acrylate (or methacrylate), octafluoropropyl acrylate (or methacrylate), 2-adamantane, and an adamantane derivative monoacrylate (or methacrylate) such as adamantyl acrylate (or methacrylate) having monovalent monoacrylate (or methacrylate) which is derived from adamantane diol etc.

The following materials are examples of difunctional acrylate (or methacrylate): ethylene glycol diacrylate (or methacrylate), diethylene glycol diacrylate (or methacrylate), butanediol diacrylate (or methacrylate), hexanediol diacrylate (or methacrylate), nonanediol diacrylate (or methacrylate), ethoxylated hexane diol diacrylate (or methacrylate), propoxylated hexane diol diacrylate (or methacrylate), polyethylene glycol diacrylate (or methacrylate), tripropylene glycol diacrylate (or methacrylate), polypropylene glycol diacrylate (or methacrylate), neopentyl glycol diacrylate (or methacrylate), ethoxylated neopentyl glycol diacrylate (or methacrylate), and hydroxypivalic neopentyl glycol diacrylate (or methacrylate) etc.

The following materials are examples of acrylate (or methacrylate) having three or more acrylic functional groups: trifunctional acrylates (or methacrylates) such as trimethylolpropane triacrylate (or methacrylate), ethoxylated trimethylolpropane triacrylate (or methacrylate), propoxylated trimethylolpropane triacrylate (or methacrylate), tris(2-hydroxyethyl)isocyanate triacrylate (or methacrylate) and glycerin triacrylate (or methacrylate) etc., acrylates (or methacrylates) with three acrylic groups such as pentaerythritol triacrylate (or methacrylate), dipentaerythritol triacrylate (or methacrylate) and ditrimethylolpropane triacrylate (or methacrylate) etc., polyfunctional acrylates (or methacrylates) with more than three acrylic groups such as pentaerythritol tetraacrylate (or methacrylate), ditrimethylolpropane tetraacrylate (or methacrylate), dipentaerythritol tetraacrylate (or methacrylate), dipentaerythritol pentaacrylate (or methacrylate), ditrimethylolpropane pentaacrylate (or methacrylate), dipentaerythritol hexaacrylate (or methacrylate) and ditrimethylolpropane hexaacrylate (or methacrylate) etc., and polyfunctional acrylates (or methacrylates) which is obtained from these acrylates (or methacrylates) by substituting any part of these with an alkyl group or ε-caprolactone etc.

Among various acrylic materials, polyfunctional urethane acrylates are preferably used because it is possible to easily control properties of the hard coat layer by designing molecular structure and adjusting the molecular weight to a desired scale. The urethane acrylates can be obtained by a reaction of polyol, polyvalent isocyanate and acrylate having a hydroxyl group. Although UA-306H, UA-306T and UA-3061 etc. (made by Kyoeisha Chemical Co., Ltd.), UV-1700B, UV-6300B, UV-7600B, UV-7605B, UV-7640B and UV-7650B etc. (made by Nippon Synthetic Chemical Industry Co., Ltd.), U-4HA, U-4HA, U-6HA, UA-100H, U-6LPA, U-15HA, UA-32P and U-324A etc. (made by Shin-Nakamura Chemical Co., Ltd.), Ebecryl-1290, Ebecryl-1290K and Ebecryl-5129 etc. (made by Daicel-UCB Co., Ltd.), UN-3220HA, UN-3220HB, UN-3220HC and UN-3220HS etc. (made by Negami Chemical industrial Co., Ltd.) are specific examples, the present invention is not limited to these.

In addition, in the case where the coating liquid for forming a hard coat layer is cured by ultraviolet light, photopolymerization initiator is added to the coating liquid for forming a hard coat layer. The photopolymerization initiator is an additive which generates radicals as ultraviolet light is irradiated. For example, acetophenone, benzoin, benzophenone, phosphine oxide, ketals, anthraquinone and thioxanthone can be used as the photopolymerization initiator. In addition, the amount of photopolymerization initiator added to the coating liquid is in the range of 0.1-10 parts by weight, preferably 1-7 parts by weight, and more preferably 1-5 parts by weight relative to 100 parts by weight of ionizing radiation curable material.

Furthermore, solvents and other additives can also be added to the hard coat layer if necessary. Aromatic hydrocarbons such as toluene, xylene and cyclohexylbenzene etc., hydrocarbons such as cyclohexane and n-hexane etc., ethers such as dibutyl ether, dimethoxymethane, dimethoxyethane, diethoxyethane, propylene oxide, dioxane, dioxolane, trioxane, tetrahydrofuran, anisole and phenetol etc., ketones such as methyl isobutyl ketone, methyl butyl ketone, acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., cellosolves such as methyl cellosolve, cellosolve, butyl cellosolve and cellosolve acetate etc. can be used as the solvent considering coating suitability etc. In addition surface conditioner, refractive index conditioner, adhesiveness improver and curing agent may also be added to the coating liquid as additives.

In particular, it is preferable that the coating liquid for forming a hard coat layer contains a solvent which dissolves the transparent substrate. A solvent which dissolves the transparent substrate contained in the coating liquid for forming a hard coat layer serves to improve adhesiveness between the transparent substrate and the resultant hard coat layer.

In addition, the coating liquid for forming a hard coat layer may include other additives. Antifoam, leveling agent, antioxidant, ultraviolet absorber, photostabilizer and polymerization inhibitor are some examples which may be used as such additives. This invention, however, is not limited to these.

It is preferable that the thickness of the hard coat layer is in the range of 3-15 μm. If the thickness is less than 3 μm, surface hardness of the anti-reflection film becomes insufficient and the abrasion resistance falls. On the other hand, if the thickness exceeds 15 um, the hard coat layer heavily curls by the shrinkage in curing resulting in problems of cracks on the hard coat layer and a hindrance to make the anti-reflection film into a polarizing plate of an LCD.

The transparent substrate is formed in the above described way.

Next, a forming method of the antistatic layer on the hard coat layer is described.

Before the antistatic layer is formed on the hard coat layer, surface treatments such as acid treatment, alkali treatment, corona treatment and atmosphere glow discharge plasma method etc. may be performed. It is possible to improve the adhesiveness between the hard coat layer and the antistatic layer by these surface treatments.

Especially, in the case where silicon alkoxide or a metal alkoxide is used as a binder matrix forming material, it is preferable that the alkali treatment is performed before forming the antistatic layer on the hard coat layer. It is possible to improve the adhesiveness between the hard coat layer and the antistatic layer by the alkali treatment onto the hard coat layer so as to improve the abrasion resistance of the anti-reflection film.

It is possible to form the antistatic layer of the present invention by coating a coating liquid which contains conductive particles and a binder matrix forming material onto the hard coat layer to make a coated film. At this moment, a coating method using a roll coater, a reverse coater, a gravure coater, a micro gravure coater, a knife coater, a bar coater, a wire bar coater, a die coater or a dip coater can be used as the coating method.

It is possible to use conductive metal oxide particles such as indium oxide, tin oxide, indium oxide-tin oxide (ITO), zinc oxide, zinc oxide-aluminum oxide (AZO), zinc oxide-gallium oxide (GZO), indium oxide-cerium oxide, antimony oxide, antimony oxide-tin oxide (ATO), and tungsten oxide etc. can be used as the conductive particles.

In particular, zinc oxide series particles are preferred to be used as the metal oxide particles. Zinc oxide series conductive particles such as zinc oxide, aluminum doped zinc oxide (AZO) and gallium doped zinc oxide (GZO) etc. have a tendency of decreasing absorption loss in light transmittance with increasing wavelength in the visible light region. Thus, it is possible to make an anti-reflection film having properties satisfying $Q_{450} < Q_{550} < Q_{650}$ by using conductive inorganic particles of zinc oxide series.

It is preferable that the conductive particles which form the antistatic layer of the present invention have a particle size in the range of 1-100 nm in diameter. In the case where the particle size exceeds 100 nm, the hard coat layer becomes white and the visible light transmittance of the anti-reflection film is liable to decrease because of strong light reflection by Rayleigh scattering. In addition, in the case where the particle size exceeds 100 nm, the haze of the anti-reflection film increases and it becomes difficult to make the haze 0.5 or less. On the other hand, in the case where the particle size is less than 1 nm, there are problems that the surface resistivity of the anti-reflection film becomes high and the conductivity drops, and the particles agglutinate together and a dispersion state in the antistatic layer becomes uneven. A plurality of types (in material and size) of particles may be used although it is not necessary.

In addition, a conductive polymer may be added to the antistatic layer. Polyacetylene, polyaniline, polythiophene, polypyrrole, polyphenylene sulfide (PPS), poly(1,6-heptadiyne), polybiphenylene (polyparaphenylene), poly(paraphenylene sulfide), polyphenylacetylene, poly(2,5-phenylene) and a derivative of these, and a blend of these (including a blend of derivatives of these) can be used as the conductive polymer (electron conductive).

It is possible to provide conductivity to the antistatic layer even with a small amount of these conductive polymers. In addition, these polymers have a broad absorption in the whole range of visible light without any specific absorption peaks so as to be preferably used in the present invention.

A silicon alkoxide hydrolysate can be used as the binder matrix forming material. It is preferable that the silicon alkoxide is expressed by a chemical formula (1): $R_xSi(OR')_{4-x}$, where R is an alkyl group and x is an integer satisfying $0 \leq x \leq 3$.

For example, tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane and hexyltrimethoxysilane etc. can be used as the silicon alkoxide which is expressed by the chemical formula (1). The silicon alkoxide hydrolysate is obtained from the silicon alkoxides of the chemical formula (1) by, for example, a hydrolysis with hydrochloric acid.

Moreover, a silicon alkoxide expressed by a chemical formula (2): $R''_ySi(OR')_{4-y}$, where R'' is a reactive function group and y is an integer satisfying $1 \leq x \leq 3$, can be added to the silicon alkoxide expressed by a chemical formula (1): $R_xSi(OR')_{4-x}$, where R is an alkyl group and x is an integer satisfying $0 \leq x \leq 3$, as the silicon alkoxide. At this time, either an epoxy group or a glycidoxy group is preferably used as the reactive function group. It is preferable that the silicon alkoxide of the chemical formula (2) is contained by a ratio in the range of 0.5-30 mol % relative to the all of the silicon alkoxide, and it is more preferable that the silicon alkoxide of the chemical formula (2) is contained by a ratio in the range of 4-12 mol %. It is possible to improve weather resistance by an addition of the silicon alkoxide of the chemical formula (2).

In addition, it is also possible to use an ionizing radiation curable material as the binder matrix forming material. Acrylic materials can be used as the ionizing radiation curable material the same as in the case of the coating liquid for forming a hard coat layer. The acrylic materials cited for forming a hard coat layer can again be used as the acrylic material. Thus, a monofunctional or polyfunctional acrylate (or methacrylate) such as acrylic (or methacrylic) ester of polyol, or polyfunctional urethane acrylate (or methacrylate) synthesized from diisocyanate and hydroxyester of polyol and acrylic (or methacrylic) acid etc. can be used as the acrylic material. Besides these, polyether resin, polyester resin, epoxy resin, alkyd resin, spiroacetal resin, polybutadiene resin and polythiol-polyene resin having an acrylic functional group can also be used as the ionizing radiation curable resin. In addition, in the case where an ionizing radiation curable material is used as the binder matrix forming material, photopolymerization initiator is added if necessary. Photopolymerization initiators cited for the coating liquid for forming a hard coat layer can also be used as the photopolymerization initiator herein.

A solvent and additives can be added to the coating liquid for forming an antistatic layer if necessary. Aromatic hydrocarbons such as toluene, xylene and cyclohexylbenzene etc., hydrocarbons such as cyclohexane and n-hexane etc., ethers such as dibutyl ether, dimethoxymethane, dimethoxyethane, diethoxyethane, propylene oxide, dioxane, dioxolane, trioxane, tetrahydrofuran, anisole and phenetol etc., ketones such as methyl isobutyl ketone, methyl butyl ketone, acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., cellosolves such as methyl cellosolve, cellosolve, butyl cellosolve and cellosolve acetate etc., alcohols such as methanol, ethanol and isopropyl alcohol etc., and water can be used as the solvent considering coating suitability etc. In addition, additives such as surface conditioner, antistatic agent, antifouling agent, water repellant, refractive index conditioner, adhesiveness improver and curing agent etc. can be added to the coating liquid.

In the case where a silicon alkoxide hydrolysate is used as the binder matrix forming material, a coating liquid for forming an antistatic layer containing a silicon alkoxide hydrolysate and conductive particles is coated onto the hard coat layer on the transparent substrate to form a coated layer followed by drying, heating to perform a dehydrocondensation of silicon alkoxide to form the antistatic layer. Whereas in the case where an ionizing radiation curable material is used as the binder matrix forming material, a coating liquid for forming an antistatic layer containing an ionizing radiation curable material and conductive particles is coated onto the hard coat layer on the transparent substrate to form a coated layer followed by drying if necessary, and irradiating ionizing radiation such as ultraviolet light or an electron beam to form the antistatic layer.

It is possible in the anti-reflection film of the present invention to form the antistatic layer without using conductive particles if a conductive material such as conductive polymer etc. is used as the binder matrix forming material in the coating liquid for forming an antistatic layer.

The antistatic layer of the present invention is formed in such a way that the optical thickness (nd) of the antistatic layer, which is obtained by multiplying the thickness (d) of the antistatic layer by the refractive index (n) of the antistatic layer, is half as long as the wavelength of the visible light. Thus, it is desirable that the optical thickness of the antistatic layer is in the range of 230-270 nm. If the optical thickness of the antistatic layer is in the range of 230-270 nm, which corresponds to an optical design of λ/2 when λ=500 nm, the reflection hue becomes small. In addition, although the thickness of the antistatic layer has a certain level of variation since the layer is formed by a wet coating method, it is possible to provide an anti-reflection film with little color unevenness by adjusting the optical thickness of the antistatic layer within this range. The antistatic layer is formed on the hard coat layer as described above.

Next, a low refractive index layer which is formed on the antistatic layer is described. The low refractive index layer of the present invention can be formed by a wet coating method of coating a coating liquid for forming a low refractive index layer onto the antistatic layer to form a coated layer and curing this coated layer. At this time, a coating method using a roll coater, a reverse roll coater, a gravure coater, a micro gravure coater, a knife coater, a bar coater, a wire bar coater, a die coater and a dip coater can be used.

Particles made of low refractive index materials such as LiF, MgF, 3NaF.AlF, AlF (refractive index: 1.4), and $Na_3AlF_6$ (cryolite, refractive index: 1.33) etc. can be used as the low refractive index particles. In addition, particles having pores therein are preferably used as the low refractive index particles. Particles having pores therein have a significantly small refractive index because the refractive index of pores is presumed as that of air (almost equal to 1). In specific, silica particles having pores inside are available.

It is preferable that the low refractive index layer particles used in the low refractive index layer have a size in the range of 1-100 nm in diameter. If the size exceeds 100 nm, the transparency of the anti-reflection film is liable to decrease because the low refractive index layer becomes white due to strong light reflection by Rayleigh scattering. On the other hand, if the size is less than 1 nm, the low refractive index particles agglutinate resulting in troubles such as uneven dispersion of the low refractive index particles in the low refractive index layer etc.

It is possible that silicon alkoxide hydrolysates can be used as the binder matrix forming material. It is preferable that the silicon alkoxide hydrolysates have a structure of a chemical formula (1): $R_xSi(OR')_{4-x}$, where R is an alkyl group and x is an integer satisfying $0 \leq x \leq 3$. The examples of silicon alkoxides which satisfy the chemical formula (1) have been cited as a material for the coating liquid for forming an antistatic layer above.

Moreover, it is possible to add a silicon alkoxide hydrolysate of the chemical formula (3): $R'_zSi(OR)_{4-z}$, where R' is a inactive functional group having an alkyl group, a fluoroalkyl group or a fluoroalkylene oxide group and z is an integer satisfying $1 \leq z \leq 3$ to a silicon alkoxide hydrolysate of the chemical formula (1) as the binder matrix forming material for the coating liquid for forming a low refractive index layer. This addition of a silicon alkoxide hydrolysate of the chemical formula (3) provides antifouling properties to the low refractive index layer surface of the anti-reflection film and decreases the refractive index of the low refractive index layer further.

Examples of the silicon alkoxide of the chemical formula (3) are octadecyltrimethoxysilane and 1H,1H,2H,2H-perfluorooctyltrimethoxysilane etc.

It is also possible to use an ionizing radiation curable material as the binder matrix forming material of the coating liquid for forming a low refractive index layer. Acrylic materials can be used as the ionizing radiation curable material similar to the case of the coating liquid for forming a hard coat layer and the coating liquid for forming an antistatic layer. The same acrylic material as in the case of the coating liquid for forming a hard coat layer can be used as the acrylic material of the coating liquid for forming a low refractive index layer, and thus, monofunctional or polyfunctional acrylates (or methacrylates) such as acrylic (or methacrylic) ester of polyol, and urethane acrylates or (methacrylates) synthesized from a diisocyanate and a hydroxyester of a polyol and an acrylic (or methacrylic) acid etc. can be used as the acrylic material. Besides these, polyether resin, polyester resin, epoxy resin, alkyd resin, spiroacetal resin, polybutadiene resin and polythiol-polyene resin having an acrylic functional group are also available as the ionizing radiation curable resin.

In the case where a silicon alkoxide hydrolysate is used as the binder matrix forming material, a coating liquid containing a silicon alkoxide hydrolysate and low refractive index particles is coated on the transparent substrate on which the hard coat layer and the antistatic layer have been preliminarily formed so as to form a coated layer followed by drying, heating to perform a dehydrocondensation of silicon alkoxide to form the low refractive index layer. Whereas in the case where an ionizing radiation curable material is used as the binder matrix forming material, a coating liquid containing an ionizing radiation curable material and low refractive index particles is coated on the transparent substrate on which the hard coat layer and the antistatic layer have been preliminarily formed so as to form a coated layer followed by drying if necessary and irradiating ionizing radiation such as ultraviolet light or an electron beam to form the low refractive index layer.

A solvent and additives can be added to the coating liquid for forming a low refractive index layer if necessary. Aromatic hydrocarbons such as toluene, xylene and cyclohexylbenzene etc., hydrocarbons such as cyclohexane and n-hexane etc., ethers such as dibutyl ether, dimethoxymethane, dimethoxyethane, diethoxyethane, propylene oxide, dioxane, dioxolane, trioxane, tetrahydrofuran, anisole and phenetol etc., ketones such as methyl isobutyl ketone, methyl butyl ketone, acetone, methyl ethyl ketone, diethyl ketone, dipropyl ketone, diisobutyl ketone, cyclopentanone, cyclohexanone and methylcyclohexanone etc., esters such as ethyl formate, propyl formate, n-pentyl formate, methyl acetate, ethyl acetate, methyl propionate, ethyl propionate, n-pentyl acetate and γ-butyrolactone etc., cellosolves such as methyl cellosolve, cellosolve, butyl cellosolve and cellosolve acetate etc., alcohols such as methanol, ethanol and isopropyl alcohol etc., and water can be used as the solvent considering coating suitability etc. In addition, additives such as surface conditioner, leveling agent, refractive index conditioner, adhesiveness improver and photosensitizer etc. can be added to the coating liquid.

In addition, in the case where the ionizing radiation curable material is used as the binder matrix forming material, a photopolymerization initiator is added if necessary. The same photopolymerization initiators as those of the coating liquid for forming a hard coat layer can be used as the photopolymerization initiators of the low refractive index layer. In addition, even in the case where the ionizing radiation curable material is used as the binder matrix forming material, it is preferable that an antifouling material is added to the surface of the low refractive index layer. It is possible to use a fluoropolymer or a silicone as the antifouling material.

By using low refractive index materials of ionizing radiation curable fluoro-materials as the binder matrix forming material of the coating liquid for forming a low refractive index layer, it is also possible to form a low refractive index layer with no low refractive index particles in the anti-reflection film of the present invention.

The low refractive index layer of the anti-reflection film in the present invention is formed in such a way that the optical thickness (nd) of the low refractive index layer, which is obtained by multiplying the refractive index (n) of the low refractive index layer by the thickness (d) of the low refractive index layer, becomes one fourth as long as the wavelength of the visible light. At this time, it is preferable that the optical thickness of the low refractive index layer is in the range of 115-135 nm. It is possible to make the reflection hue small by designing the optical thickness of the low refractive index layer within the range of 115-135 nm and around λ/4 when λ=500 nm. In addition, although there is a thickness variation in the low refractive index layer since this layer is formed by a wet coating method, it is possible to make an anti-reflection film have little color unevenness due to the thickness variation if the thickness of the low refractive index layer is adjusted within this range.

If necessary, function layers having an antifouling function, an electromagnetic shielding function, an infrared absorption function, an ultraviolet absorption function and a color compensation function etc. is arranged in the anti-reflection film of the present invention. Examples of these function layers are antifouling layer, electromagnetic shielding layer, infrared absorption layer, ultraviolet absorption layer and color compensation layer etc. It does not matter whether these function layers have a single layer structure or a multilayer structure. The function layer may have a plurality of functions within a single layer. In addition, it is possible to arrange the function layer on the surface of the anti-reflection film or between other layers. In addition, a primer layer or an adhesion layer etc. may be arranged between layers in order to improve adhesion between any adjacent layers.

It is possible to make a polarizing plate by using the anti-reflection film of the present invention and arranging a polarizing layer and a second transparent substrate on the opposite surface of the transparent substrate from the side on which the low refractive index layer is formed. For example, an iodine added elongated polyvinyl alcohol (PVA) can be used as the polarizing layer. In addition, the same transparent substrate as that of the anti-reflection film of the present invention, preferably a triacetyl cellulose film, can be used as the second transparent substrate.

In addition, the polarizing plate using the anti-reflection film of the present invention as a part thereof can be applied to a transmission type LCD. At this time, the polarizing plate is arranged in the order of the polarizing plate, a liquid crystal cell, a second polarizing plate, and a backlight unit from the observer's side. And, the low refractive index layer of the polarizing plate is arranged at the closest position to the observer. It is possible to provide a transmission type LCD with an excellent antistatic and anti-reflection function as well as reducing the color of the reflection light.

EXAMPLE

Example 1

<Transparent Substrate>

80 μm thick triacetyl cellulose films were prepared as the transparent substrates.

<(Original) Polarizing Plate>

An (original) polarizing plate was prepared by arranging a polarizing layer of iodine added elongated polyvinyl alcohol between a pair of 80 μm thick triacetyl cellulose films (a first and a second transparent substrates).

<Formation of Hard Coat Layer>

10 parts by weight of dipentaerythritol triacrylate, 10 parts by weight of pentaerythritol tetraacrylate and 30 parts by weight of urethane acrylate (UA 306T by Kyoeisha chemical Co., Ltd.) as the ionizing radiation curable material, 2.5 parts by weight of Irgacure 184 (by Ciba Japan) as the photopolymerization initiator, and 25 parts by weight of methyl ethyl ketone and 25 parts by weight of butyl acetate were blended together to prepare a coating liquid for forming a hard coat layer. The coating liquid for forming a hard coat layer was coated on a surface of the polarizing plate (on first polarizing plate) and on a transparent substrate of triacetyl cellulose film by a wire bar coater. Subsequently, the coated triacetyl cellulose film and the coated polarizing plate were dried in an oven at 80° C. for one minute. After drying, hard coat layers were formed by irradiating ultraviolet light with a 120 W output power of a metal halide lamp for 10 seconds from a point 20 cm away. The resultant hard coat layers had a thickness of 5 μm and refractive index of 1.52.

<Formation of Antistatic Layer>

Tetraethoxysilane as an organosilicon compound raw material was added with isopropyl alcohol and 0.1 N hydrochloric acid and hydrolyzed to obtain a solution containing tetraethoxysilane polymer. This solution was mixed with a dispersion solution of gallium doped zinc oxide (GZO) particles (solid content ratio: 30% by weight, dispersion solvent: isopropyl alcohol (IPA)), and further added with isopropyl alcohol to obtain a coating liquid for forming an antistatic layer which contains 2.5 parts by weight of tetraethoxysilane polymer and 2.5 parts by weight of gallium doped zinc oxide (GZO) particles per 100 parts by weight. The resultant coating liquid for forming an antistatic layer was coated onto the hard coat layers formed on the transparent substrate and on the polarizing plate by a wire bar coater and dried in an oven at 120° C. for one minute so that antistatic layers were obtained. The antistatic layers had a thickness of 163 nm, refractive index of 1.53 and thus an optical thickness of 250 nm.

<Formation of Low Refractive Index Layer>

A 95:5 molar ratio mixture of tetraethoxysilane and 1H,1H,2H,2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 2.0 parts by weight of organosilicon compound and 2.0 parts by weight of low refractive index silica particles per 100 parts by weight. The coating liquid for forming a low refractive index layer was coated onto the antistatic layers formed on the transparent substrate and on the polarizing plate by a wire bar coater, and dried at 120° C. for one minute so that low refractive index layers were obtained. The low refractive index layers had a thickness of 91 nm, refractive index of 1.37 and thus an optical thickness of 125 nm.

An anti-reflection film which included a transparent substrate, a hard coat layer, antistatic layer and a low refractive index layer in order, and a polarizing plate which included a hard coat layer, antistatic layer and a low refractive index layer in order on an original polarizing plate which had a second transparent substrate, a polarizing layer and a first transparent substrate were manufactured as described above.

Example 2

<Transparent Substrate>

Similar to the case of <<Example 1>>, 80 μm thick triacetyl cellulose films were prepared as the transparent substrates.

<(Original) Polarizing Plate>

Similar to the case of <<Example 1>>, an (original) polarizing plate was prepared by arranging an iodine-added elongated polyvinyl alcohol as a polarizing layer between a pair of 80 μm thick triacetyl cellulose films (as a first and a second transparent substrates).

<Formation of Hard Coat Layer>

Similar to the case of <<Example 1>>, hard coat layers were formed on a surface of the polarizing plate (on the first polarizing plate) and on a transparent substrate of triacetyl cellulose film. The resultant hard coat layers had a thickness of 5 μm and refractive index of 1.52.

<Formation of Antistatic Layer>

Similar to the case of <<Example 1>>, antistatic layers were formed onto the hard coat layers formed on a surface of the polarizing plate (on the first polarizing plate) and on a transparent substrate of triacetyl cellulose film, respectively. The antistatic layers had a thickness of 163 nm, refractive index of 1.53 and thus an optical thickness of 250 nm.

<Formation of Low Refractive Index Layer>

A 95:5 molar ratio mixture of tetraethoxysilane and 1H,1H,2H,2H-perfluorooctyl trimethoxysilane as an organosilicon compound was added with isopropyl alcohol and 0.1 N hydrochloric acid and hydrolyzed to obtain a solution containing an organosilicon compound polymer. This solution was blended with a dispersion solution of low refractive index silica particles having pores therein (primary particle diameter: 30 nm, solid content: 20% by weight) and further added with isopropyl alcohol to obtain coating liquid for forming a low refractive index layer which contains 1.8 parts by weight of organosilicon compound and 2.2 parts by weight of low refractive index silica particles per 100 parts by weight. The coating liquid for forming a low refractive index layer was coated onto the antistatic layers formed on the transparent substrate and on the polarizing plate by a wire bar coater, and dried at 120° C. for one minute so that low refractive index layers were obtained. The low refractive index layers had a thickness of 94 nm, refractive index of 1.33 and thus an optical thickness of 125 nm.

An anti-reflection film which included a transparent substrate, a hard coat layer, antistatic layer and a low refractive index layer in order, and a polarizing plate which included a hard coat layer, antistatic layer and a low refractive index layer in order on an original polarizing plate which had a second transparent substrate, a polarizing layer and a first transparent substrate were manufactured as described above.

Example 3

<Transparent Substrate>

Similar to the case of <<Example 1>>, 80 μm thick triacetyl cellulose films were prepared as the transparent substrates.

<(Original) Polarizing Plate>

Similar to the case of <<Example 1>>, an (original) polarizing plate was prepared by arranging an iodine-added elongated polyvinyl alcohol as a polarizing layer between a pair of 80 μm thick triacetyl cellulose films (as a first and a second transparent substrates).

<Formation of Hard Coat Layer>

Similar to the case of <<Example 1>>, hard coat layers were formed on a surface of the polarizing plate (on the first polarizing plate) and on a transparent substrate of triacetyl cellulose film. The resultant hard coat layers had a thickness of 5 μm and refractive index of 1.52.

<Formation of Antistatic Layer>

Tetraethoxysilane as an organosilicon compound raw material was added with isopropyl alcohol and 0.1 N hydrochloric acid and hydrolyzed to obtain a solution containing tetraethoxysilane polymer. This solution was mixed with a dispersion solution of aluminum doped zinc oxide (AZO) particles (solid content ratio: 30% by weight, dispersion solvent: isopropyl alcohol (IPA)), and further added with isopropyl alcohol to obtain a coating liquid for forming an antistatic layer which contains 2.0 parts by weight of tetraethoxysilane polymer and 3.0 parts by weight of aluminum doped zinc oxide (AZO) particles per 100 parts by weight. The resultant coating liquid for forming an antistatic layer was coated onto the hard coat layers formed on the transparent substrate and on the polarizing plate by a wire bar coater and dried in an oven at 120° C. for one minute so that antistatic layers were obtained. The antistatic layers had a thickness of 134 nm, refractive index of 1.54 and thus an optical thickness of 260 nm.

<Formation of Low Refractive Index Layer>

Similar to the case of <<Example 1>>, low refractive index layers were formed onto the antistatic layers formed on a surface of the polarizing plate (on the first polarizing plate) and on a transparent substrate of triacetyl cellulose film, respectively. The low refractive index layers had a thickness of 91 nm, refractive index of 1.37 and thus an optical thickness of 125 nm.

An anti-reflection film which included a transparent substrate, a hard coat layer, antistatic layer and a low refractive index layer in order, and a polarizing plate which included a hard coat layer, antistatic layer and a low refractive index layer in order on an original polarizing plate which had a second transparent substrate, a polarizing layer and a first transparent substrate were manufactured as described above.

Comparative Example 1

<(Original) Polarizing Plate>

Similar to the case of <<Example 1>>, an (original) polarizing plate was prepared by arranging an iodine-added elongated polyvinyl alcohol as a polarizing layer between a pair of 80 μm thick triacetyl cellulose films (as a first and a second transparent substrates).

<Formation of Hard Coat Layer>

Similar to the case of <<Example 1>>, a hard coat layer was formed on a surface of the (original) polarizing plate (on the first polarizing plate). The resultant hard coat layers had a thickness of 5 μm and refractive index of 1.52.

A polarizing plate which included a hard coat layer on the original polarizing plate which had a second transparent substrate, a polarizing layer and a first transparent substrate was manufactured as described above.

Comparative Example 2

<Transparent Substrate>

Similar to the case of <<Example 1>>, 80 μm thick triacetyl cellulose films were prepared as the transparent substrates.

<(Original) Polarizing Plate>

Similar to the case of <<Example 1>>, an (original) polarizing plate was prepared by arranging an iodine-added elongated polyvinyl alcohol as a polarizing layer between a pair of 80 μm thick triacetyl cellulose films (as a first and a second transparent substrates).

<Formation of Hard Coat Layer>

Similar to the case of <<Example 1>>, hard coat layers were formed on a surface of the polarizing plate (on the first polarizing plate) and on a transparent substrate of triacetyl cellulose film. The resultant hard coat layers had a thickness of 5 μm and refractive index of 1.52.

<Formation of Low Refractive Index Layer>

Similar to the case of <<Example 1>>, low refractive index layers were formed onto the hard coat layers formed on a surface of the polarizing plate (on the first polarizing plate) and on a transparent substrate of triacetyl cellulose film, respectively. The low refractive index layers had a thickness of 91 nm, refractive index of 1.37 and thus an optical thickness of 125 nm.

An anti-reflection film which included a transparent substrate, a hard coat layer and a low refractive index layer in order, and a polarizing plate which included a hard coat layer and a low refractive index layer in order on an original polarizing plate which had a second transparent substrate, a polarizing layer and a first transparent substrate were manufactured as described above.

Comparative Example 3

<Transparent Substrate>
Similar to the case of <<Example 1>>, 80 μm thick triacetyl cellulose films were prepared as the transparent substrates.
<(Original) Polarizing Plate>
Similar to the case of <<Example 1>>, an (original) polarizing plate was prepared by arranging an iodine-added elongated polyvinyl alcohol as a polarizing layer between a pair of 80 μm thick triacetyl cellulose films (as a first and a second transparent substrates).
<Formation of Antistatic Hard Coat Layer>
10 parts by weight of dipentaerythritol triacrylate, 10 parts by weight of pentaerythritol tetraacrylate and 30 parts by weight of urethane acrylate (UA 306T by Kyoeisha chemical Co., Ltd.) as the ionizing radiation curable material, 2.5 parts by weight of Irgacure 184 (by Ciba Japan) as the photopolymerization initiator, 12 parts by weight of antimony doped tin oxide (ATO) particles having 8 nm of primary particle diameter, and 50 parts by weight of methyl ethyl ketone and 50 parts by weight of butyl acetate as the solvent were blended together to prepare a coating liquid for forming an antistatic hard coat layer. The coating liquid for forming an antistatic hard coat layer was coated on a surface of the polarizing plate (on the first polarizing plate) and on a transparent substrate of triacetyl cellulose film by a wire bar coater. Subsequently, the coated triacetyl cellulose film and the coated polarizing plate were dried in an oven at 80° C. for one minute. After drying, antistatic hard coat layers were formed by irradiating ultraviolet light with a 120 W output power of a metal halide lamp for 10 seconds from a point 20 cm away. The resultant antistatic hard coat layers had a thickness of 5 μm and refractive index of 1.58.
<Formation of Low Refractive Index Layer>
Similar to the case of <<Example 1>>, low refractive index layers were formed onto the antistatic hard coat layers formed on a surface of the polarizing plate (on the first polarizing plate) and on a transparent substrate of triacetyl cellulose film, respectively. The low refractive index layers had a thickness of 91 nm, refractive index of 1.37 and thus an optical thickness of 125 nm.

An anti-reflection film which included a transparent substrate, an antistatic hard coat layer and a low refractive index layer in order, and a polarizing plate which included an antistatic hard coat layer and a low refractive index layer in order on an original polarizing plate which had a second transparent substrate, a polarizing layer and a first transparent substrate were manufactured as described above.

Comparative Example 4

<Transparent substrate>
Similar to the case of <<Example 1>>, 80 μm thick triacetyl cellulose films were prepared as the transparent substrates.
<(Original) Polarizing Plate>
Similar to the case of <<Example 1>>, an (original) polarizing plate was prepared by arranging an iodine-added elongated polyvinyl alcohol as a polarizing layer between a pair of 80 μm thick triacetyl cellulose films (as a first and a second transparent substrates).
<Formation of Hard Coat Layer>
Similar to the case of <<Example 1>>, hard coat layers were formed on a surface of the polarizing plate (on the first polarizing plate) and on a transparent substrate of triacetyl cellulose film. The resultant hard coat layers had a thickness of 5 μm and refractive index of 1.52.
<Formation of Antistatic Layer>
16.7 parts by weight of dispersion solution (solid content ratio: 30% by weight, dispersion solvent: methyl ethyl ketone (MEK)) of gallium doped zinc oxide (GZO) particles having 30 nm of primary particle diameter, 5.0 parts by weight of dipentaerythritol triacrylate as the ionizing radiation curable material, 0.25 parts by weight of Irgacure 184 (by Ciba Japan), and 78.3 parts by weight of methyl isobutyl ketone as the solvent are blended together to prepare a coating liquid for forming an antistatic layer. The resultant coating liquid for forming an antistatic layer was coated onto the hard coat layers formed on the transparent substrate and on the polarizing plate by a wire bar coater and dried in an oven followed by curing with 500 mJ/cm$^2$ of light exposure by conveyer type UV curing equipment so that antistatic layers were obtained. The antistatic layers had a thickness of 78 nm, refractive index of 1.60 and thus an optical thickness of 125 nm.
<Formation of Low Refractive Index Layer>
Similar to the case of <<Example 1>>, low refractive index layers were formed onto the antistatic layers formed on a surface of the polarizing plate (on the first polarizing plate) and on a transparent substrate of triacetyl cellulose film, respectively. The low refractive index layers had a thickness of 91 nm, refractive index of 1.37 and thus an optical thickness of 125 nm.

An anti-reflection film which included a transparent substrate, a hard coat layer, an antistatic layer and a low refractive index layer in order, and a polarizing plate which included a hard coat layer, an antistatic layer and a low refractive index layer in order on an original polarizing plate which had a second transparent substrate, a polarizing layer and a first transparent substrate were manufactured as described above.

Comparative Example 5

<Transparent substrate>
Similar to the case of <<Example 1>>, 80 μm thick triacetyl cellulose films were prepared as the transparent substrates.
<(Original) Polarizing Plate>
Similar to the case of <<Example 1>>, an (original) polarizing plate was prepared by arranging an iodine-added elongated polyvinyl alcohol as a polarizing layer between a pair of 80 μm thick triacetyl cellulose films (as a first and a second transparent substrates).
<Formation of Hard Coat Layer>
Similar to the case of <<Example 1>>, hard coat layers were formed on a surface of the polarizing plate (on the first polarizing plate) and on a transparent substrate of triacetyl cellulose film. The resultant hard coat layers had a thickness of 5 μm and refractive index of 1.52.
<Formation of Antistatic Layer>
Tetraethoxysilane as an organosilicon compound raw material was added with isopropyl alcohol and 0.1 N hydrochloric acid and hydrolyzed to obtain a solution containing tetraethoxysilane polymer. This solution was mixed with antimony pentaoxide particles having 20 nm of primary particles diameter and added with isopropyl alcohol to obtain a coating liquid for forming an antistatic layer containing 2.5 parts by weight of tetraethoxysilane polymer and 2.5 parts by weight of antimony pentaoxide particles per 100 parts by weight. The triacetyl cellulose film and the (original) polarizing plate on which the hard coat layers were formed were immersed in a 1.5 N NaOH aqueous solution at 50° C. for 2 minutes to receive an alkali treatment. After washing with water, the hard coat layers were dipped in 0.5 wt % of H2SO4 aqueous solution for 30 seconds to neutralize the alkali, washed with water and dried. Subsequently, the coating liquid for forming an antistatic layer was coated on these alkali treated hard coat layers by a wire bar coater and a heating treatment was performed in an oven at 120° C. for one minute so that an antistatic layers were obtained. The antistatic layers had a thickness of 180 nm, refractive index of 1.55 and thus an optical thickness of 279 nm.

<Formation of Low Refractive Index Layer>

Similar to the case of <<Example 1>>, low refractive index layers were formed onto the antistatic layers formed on a surface of the polarizing plate (on first polarizing plate) and on a transparent substrate of triacetyl cellulose film, respectively. The low refractive index layers had a thickness of 91 nm, refractive index of 1.37 and thus an optical thickness of 125 nm.

An anti-reflection film which included a transparent substrate, a hard coat layer, an antistatic layer and a low refractive index layer in order, and a polarizing plate which included a hard coat layer, an antistatic layer and a low refractive index layer in order on an original polarizing plate which had a second transparent substrate, a polarizing layer and a first transparent substrate were manufactured as described above.

The following measurements were performed on the resultant anti-reflection films and polarizing plates.

<<Characteristics Measurements of Anti-Reflection Film>>

<Average Luminous Reflectance and Reflection Hue>

The opposite surfaces of the anti-reflection films obtained in the examples and comparative examples from the sides on which the low refractive index layers were formed were painted matte black with spray. After the painting, the anti-reflection films were measured for spectral reflectance by an automated spectral photometer (U-4000 made by Hitachi Ltd.) on the surfaces on which the low refractive index layers were formed. The measurement was performed using the C light source under a condition of 2 degrees field of view and 5 degrees of incident angle. Average luminous reflectance (Y %) and reflection hue (a*, b*) were calculated from the spectral reflectance. The photopic relative luminous efficiency was used as the relative luminous efficiency.

<Spectral Reflectance>

The anti-reflection films obtained in the examples and comparative examples were painted with matte black spray on the opposite surfaces from the sides on which the low refractive index layers were formed. After this painting, the anti-reflection films were measured for spectral reflectance by an automated spectral photometer (U-4000 made by Hitachi Ltd.) on the surfaces on which the low refractive index layers were formed. The measurement was performed using the C light source under a condition of 2 degrees field of view and 5 degrees of incident angle.

<Haze (H) and Parallel Light Transmittance>

The anti-reflection films obtained in the examples and comparative examples were measured haze (H) and parallel light transmittance by a haze turbidimeter instrument (NDH-2000 made by Nippon Denshoku Industries Co., Ltd.).

<Absorption Loss in Parallel Light Average Luminous Transmittance and Absorption Loss in Light Transmittance at Various Wavelengths>

The anti-reflection films obtained in the examples and comparative examples were measured for spectral transmittance and spectral reflectance in a specular reflection direction and rectilinear transmission direction by an automated spectral photometer (U-4000 made by Hitachi Ltd.) using the C light source under a condition of 2 degrees field of view and 5 degrees of incident angle. Then, the absorption loss in average luminous transmittance (Q) and the absorption loss in light transmittance at various wavelengths ($Q_{450}$ absorption loss in light transmittance at a wavelength of 450 nm, $Q_{550}$ absorption loss in light transmittance at a wavelength of 550 nm, and $Q_{650}$: absorption loss in light transmittance at a wavelength of 650 nm) were calculated. At this time, each absorption loss in light transmittance at each wavelength ($Q_{450}$, $Q_{550}$ and $Q_{650}$) was obtained by formula 1.

$$Q_\lambda = 100 - H - T - R \qquad \text{<formula 1>}$$

where $Q_\lambda$: absorption loss in light transmittance [%]

H: haze [%]

T: spectral transmittance [%]

R: reflectance of both surfaces [%]

<Surface Resistivity>

The surface resistivities of the anti-reflection films were measured conforming to JIS (Japanese Industrial Standards) K6911 by a high resistivity measurement meter (Hiresta MCP-HT260 made by DIA Instruments Co., Ltd.).

<<Characteristics Measurements of Polarizing Plate>>

<Average Parallel Luminous Transmittance, Average Orthogonal Luminous Transmittance and Orthogonal Color Hue>

Each of the polarizing plates obtained in the examples and the comparative examples and a polarizing plate on which no hard coat layer nor anti-reflection layer were formed (just as the second polarizing layer prepared in <<Example 1>>) were arranged with a sticky layer therebetween in such a way that the polarizing axes became parallel to each other. Then, spectral transmittance in the rectilinear transmission direction was measured under a condition of 2 degrees field of view by an automated spectral photometer (U-4000 made by Hitachi Ltd.) using the C light as the light source and setting the incident angle and output angle of the light source and a detector vertical to the surface of the anti-reflection film.

In addition, each of the polarizing plates obtained in the examples and the comparative examples were combined via a tackiness layer with a polarizing plate which had no hard coat layer nor anti-reflection layer similar to that used in <<Example 1>> as the second polarizing plate. The two polarizing plates combined via the tackiness layer were arranged in such a way that the polarizing axes were orthogonal to each other. Then, the spectral transmittance was measured under a condition of 2 degrees field of view by an automated spectral photometer (U-4000 made by Hitachi Ltd.) using C light as the light source and setting the incident angle and output angle of the light source and a detector vertical to the surface of the anti-reflection film so that the average orthogonal luminous transmittance and the orthogonal hue were calculated.

In the examples, thickness of the hard coat layer was measured by a stylus film thickness meter whereas thickness of the antistatic layer and the low refractive index layer were obtained by a cross section observation using a transmission electron microscope (TEM). In addition, the refractive index and optical thickness of the hard coat layer, antistatic layer and low refractive layer were obtained from the spectral transmittance by optical simulation.

Measurement results are shown in <Table 1> to <Table 3>.

TABLE 1

Results of measurement of anti-reflection film (1)

| | Surface resistivity [Ω/□] | Average luminous reflectance | Difference between max. and min. in spectral reflectance | absorption loss in average luminous light transmittance | Difference between max. and min. in absorption loss in light transmittance |
|---|---|---|---|---|---|
| Example 1 | 3.3E+9 | 1.1% | 0.5% | 1.3% | 1.4% |
| Example 2 | 3.0E+9 | 0.7% | 0.7% | 1.3% | 1.4% |
| Example 3 | 7.0E+9 | 1.0% | 0.6% | 2.0% | 1.8% |
| Comparative example 1 | — | — | — | — | — |
| Comparative example 2 | >1.0E+13 | 1.1% | 1.0% | <0.1% | <0.1% |
| Comparative example 3 | 1.0E+10 | 1.1% | 1.1% | 6.4% | 4.1% |
| Comparative example 4 | 1.2E+10 | 0.4% | 3.0% | 0.4% | 0.5% |
| Comparative example 5 | 6E+9 | 0.9% | 1.1% | <0.1% | <0.1% |

TABLE 2

Results of measurement of anti-reflection film (2)

| | Absorption loss in light transmittance in various wavelength Q (450 nm, 550 nm, 650 nm) | | | Haze [%] | Parallel light transmittance [%] | Reflection hue | |
|---|---|---|---|---|---|---|---|
| | $Q_{450}$ | $Q_{550}$ | $Q_{650}$ | | | a* | b* |
| Example 1 | 2.0% | 1.3% | 1.1% | 0.1 | 94.9 | 2.1 | −1.2 |
| Example 2 | 1.9% | 1.3% | 1.1% | 0.1 | 95.5 | 2.8 | −2.7 |
| Example 3 | 2.7% | 2.1% | 1.4% | 0.1 | 94.2 | 2.5 | −1.8 |
| Comparative example 1 | — | — | — | — | — | — | — |
| Comparative example 2 | <0.1% | <0.1% | <0.1% | 0.1 | 96.1 | 2.7 | −1.8 |
| Comparative example 3 | 4.8% | 6.6% | 7.5% | 0.6 | 85.2 | 2.6 | −0.8 |
| Comparative example 4 | 0.6% | 0.4% | 0.3% | 0.1 | 96.0 | 8.0 | −15.9 |
| Comparative example 5 | <0.1% | <0.1% | <0.1% | 0.1 | 96.2 | 2.0 | −2.6 |

TABLE 3

Results of measurement of polarizing plate

| | Parallel average luminous transmittance | Orthogonal average luminous transmittance | Orthogonal hue | |
|---|---|---|---|---|
| | | | a* | b* |
| Example 1 | 40.2% | 0.07% | 2.2 | −3.2 |
| Example 2 | 40.8% | 0.06% | 1.3 | −2.0 |
| Example 3 | 39.9% | 0.04% | 2.1 | −3.0 |
| Comparative example 1 | 39.3% | 0.11% | 2.1 | −6.4 |
| Comparative example 2 | 40.5% | 0.16% | 2.8 | −7.5 |
| Comparative example 3 | 35.8% | 0.06% | 2.4 | −6.9 |
| Comparative example 4 | 40.7% | 0.08% | 2.6 | −4.8 |
| Comparative example 5 | 40.5% | 0.16% | 2.7 | −7.2 |

<Color Unevenness>

The resultant anti-reflection films obtained in <<Example 1>> to <<Example 3>> and <<Comparative example 2>> and <Comparative example 5> were painted black with matte black spray on the other surface from the low refractive index layer's side. After painting, the anti-reflection films were visually checked for color unevenness.

As a result of the check, it was confirmed that in the case of <<Example 1>> to <<Example 3>> no color unevenness was observed under a dark environment and little color unevenness was observed even under a bright environment.

As a result of the check, it was confirmed in the case of <<Example 1>> to <<Example 3>> that no color unevenness was observed under a dark environment and little color unevenness was observed even under a bright environment.

In addition, it was confirmed in the case of <<Comparative example 2>> and <Comparative example 3>> that no color unevenness was observed under a dark environment and acceptable color unevenness was observed under a bright environment.

In addition, it was confirmed in the case of <<Comparative example 4>> that apparent color unevenness was observed even under a dark environment.

In addition, it was confirmed in the case of <<Comparative example 5>> that color unevenness was observed under a bright environment.

<Contrast>

The resultant anti-reflection films obtained in <<Example 1>> to <<Example 3>> and <<Comparative example 2>> and <Comparative example 5> were pasted on surfaces of transmission type LCDs (FTD-W2023ADSR made by BUFFALO Inc.) with a stickiness layer in a way that the anti-reflection layers were arranged as the outermost frontal layers. Then, turning the interior lighting on and off, the contrasts of the LCDs were measured by displaying a black and a white image in a bright (200 lx) place and in a dark (0 lx) place. At this time, the LCD on which the anti-reflection film obtained in <<Comparative example 2>> was temporary selected as the standard of the evaluation.

As a result of the evaluation, it was concluded that the LCDs on which the anti-reflection films obtained in <<Example 1>> to <<Example 3>> were pasted had better contrasts in the dark place since they had smaller black luminance (luminance in the state of displaying a black image)

than the standard (the LCD on which the anti-reflection film obtained in <<Comparative example 2>> was pasted). On the other hand, it was concluded that the LCD on which the anti-reflection film obtained in <<Comparative example 3>> was pasted had a worse contrast both in the dark and the bright places since it had smaller white luminance (luminance in the states of displaying a white image) than the standard although it had smaller black luminance. In addition, it was observed that the LCDs on which the anti-reflection films obtained in <<Comparative example 4>> and <<Comparative example 5>> were pasted had substantially no better contrast both in the dark and the bright places.

In <<Example 1>> to <<Example 3>>, it was possible to obtain an anti-reflection film having not only sufficient anti-reflection and antistatic properties but also lighter color unevenness and reflection light with thinner color.

In addition, comparing the results on the orthogonal hue (b*) of the polarizing plates obtained in the examples to those obtained in the comparative examples, it was confirmed in the polarizing plate of the present invention that the problem of bluish image in the black display state can be solved by arranging a pair of the polarizing plates so that their polarizing axes are oriented orthogonal to each other, and a more desirable black display can be obtained.

What is claimed is:

1. A method for manufacturing an anti-reflection film which has a hard coat layer, an antistatic layer and a low refractive index layer on a transparent substrate, the method comprising:
   providing said antistatic layer with a conductive material of zinc oxide series particles,
   making said anti-reflection film have an average luminous reflectance in the range of 0.5-1.5% on the surface of said low refractive index layer,
   making said anti-reflection film have a difference in the range of 0.2-0.9% as a difference between the maximum and the minimum of spectral reflectance on the surface of said low refractive index layer in the wavelength region of 400-700 nm,
   making said anti-reflection film have an absorption loss in average luminous transmittance in the range of 0.5-3.0%,
   making said anti-reflection film have a difference in the range of 0.5-4.0% between the maximum of absorption losses in light transmittance at all wavelengths within the visible light region and minimum of absorption losses in light transmittance at all wavelengths within the visible light region, and
   making said anti-reflection film have a relationship of $Q_{450} > Q_{550} > Q_{650}$, wherein $Q_{450}$ is an absorption loss in light transmittance of said anti-reflection film at a wavelength of 450 nm, $Q_{550}$ is an absorption loss in light transmittance of said anti-reflection film at a wavelength of 550 nm and $Q_{650}$ is an absorption loss in light transmittance of said anti-reflection film at a wavelength of 650 nm.

2. The method according to claim 1, further comprising:
   making said antistatic layer have the optical thickness in the range of 230-270 nm,
   making said low refractive index layer have the optical thickness in the range of 115-135 nm, and
   making said anti-reflection film satisfy relationships of $0 < |n_h - n_b| \leq 0.05$ and $0.01 \leq (n_a - n_h) \leq 0.05$, wherein $n_h$ is refractive index of said hard coat layer, $n_b$ is refractive index of said transparent substrate, and $n_a$ is refractive index of said antistatic layer.

3. The method according to claim 2, further comprising:
   making said anti-reflection film have a haze of 0.5% or less, and
   making said anti-reflection film have a parallel light transmittance in the range of 94.0-96.5%.

4. The method according to claim 3, further comprising:
   making said low refractive index layer have a surface resistivity in the range of $1.0 \times 10^6$ to $1.0 \times 10^{11} \Omega/\square$.

5. The method according to claim 4, further comprising:
   making said anti-reflection film have a reflection hue satisfying $0.00 \leq a^* \leq 3.00$ and $-3.00 \leq b^* \leq 3.00$ in the L*a*b* chromaticity coordinate system.

6. A method for manufacturing a polarizing plate which has an anti-reflection film, a polarizing layer and a second transparent substrate, the method comprising
   manufacturing said anti-reflection film by the method according to claim 5, wherein said polarizing layer and said second transparent substrate are arranged in order on an opposite surface of said anti-reflection film from a side on which said low refractive index layer is formed, and wherein said polarizing layer includes iodine-added elongated polyvinyl alcohol.

7. A method for manufacturing an LCD which has a polarizing plate, a liquid crystal cell, a second polarizing plate and a backlight unit, the method comprising
   manufacturing said polarizing plate by the method according to claim 6.

8. The method according to claim 1, further comprising:
   making said anti-reflection film have a haze of 0.5% or less, and
   making said anti-reflection film have a parallel light transmittance in the range of 94.0-96.5%.

9. The method according to claim 8, further comprising:
   making said low refractive index layer have a surface resistivity in the range of $1.0 \times 10^6$ to $1.0 \times 10^{11} \Omega/\square$.

10. The method according to claim 8, further comprising:
    making said anti-reflection film have a reflection hue satisfying $0.00 \leq a^* \leq 3.00$ and $-3.00 \leq b^* \leq 3.00$ in the L*a*b* chromaticity coordinate system.

11. A method for manufacturing a polarizing plate which has an anti-reflection film, a polarizing layer and a second transparent substrate, the method comprising
    manufacturing said anti-reflection film by the method according to claim 8, wherein said polarizing layer and said second transparent substrate are arranged in order on an opposite surface of said anti-reflection film from a side on which said low refractive index layer is formed, and wherein said polarizing layer includes iodine-added elongated polyvinyl alcohol.

12. A method for manufacturing an LCD which has a polarizing plate, a liquid crystal cell, a second polarizing plate and a backlight unit, the method comprising
    manufacturing said polarizing plate by the method according to claim 11.

13. The method according to claim 1, further comprising:
    making said low refractive index layer have a surface resistivity in the range of $1.0 \times 10^6$ to $1.0 \times 10^{11} \Omega/\square$.

14. The method according to claim 1, further comprising:
    making said anti-reflection film have a reflection hue satisfying $0.00 \leq a^* \leq 3.00$ and $-3.00 \leq b^* \leq 3.00$ in the L*a*b* chromaticity coordinate system.

15. A method for manufacturing a polarizing plate which has an anti-reflection film, a polarizing layer and a second transparent substrate, the method comprising
    manufacturing said anti-reflection film by the method according to claim 1, wherein said polarizing layer and said second transparent substrate are arranged in order on an opposite surface of said anti-reflection film from a side on which said low refractive index layer is formed, and wherein said polarizing layer includes iodine-added elongated polyvinyl alcohol.

16. A method for manufacturing an LCD which has a polarizing plate, a liquid crystal cell, a second polarizing plate and a backlight unit, the method comprising manufacturing said polarizing plate by the method according to claim 15.

* * * * *